(12) United States Patent
Nabatame et al.

(10) Patent No.: US 11,057,858 B1
(45) Date of Patent: Jul. 6, 2021

(54) BASE STATION, COMMUNICATION SYSTEM AND TIME SYNCHRONIZATION METHOD BETWEEN BASE STATIONS

(71) Applicant: SoftBank Corp., Tokyo (JP)

(72) Inventors: Sho Nabatame, Tokyo (JP); Mitsukuni Konishi, Tokyo (JP); Atsushi Nagate, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 531 days.

(21) Appl. No.: 16/075,685

(22) PCT Filed: Jan. 26, 2017

(86) PCT No.: PCT/JP2017/002768
§ 371 (c)(1),
(2) Date: Aug. 6, 2018

(87) PCT Pub. No.: WO2017/141657
PCT Pub. Date: Aug. 24, 2017

(30) Foreign Application Priority Data

Feb. 19, 2016 (JP) .............................. JP2016-029955

(51) Int. Cl.
*H04W 56/00* (2009.01)
*H04L 27/26* (2006.01)
*H04L 5/00* (2006.01)

(52) U.S. Cl.
CPC ....... *H04W 56/009* (2013.01); *H04L 27/2607* (2013.01); *H04L 27/2691* (2013.01);
(Continued)

(58) Field of Classification Search
CPC ............. H04W 56/009; H04W 56/001; H04W 56/003; H04L 27/2607; H04L 27/2691; H04L 5/0007
See application file for complete search history.

(56) References Cited

U.S. PATENT DOCUMENTS

2012/0122453 A1  5/2012  Shin et al.
2013/0114512 A1*  5/2013  Yamamoto .......... H04W 56/001
                                                     370/328
(Continued)

FOREIGN PATENT DOCUMENTS

JP     2012-129793 A    7/2012

OTHER PUBLICATIONS

Mitsukuni Konishi, et al., A Study on Listening Synchronization by Subframe Shift for eICIC, Research and Development Division, SoftBank Mobile Corp., Proceedings of the Society Conference IEICE 2014, B-5-69, 3GPP TS36.922, IEEE Communications Magazine, pp. 70-77, Sep. 2013.

(Continued)

*Primary Examiner* — Duc C Ho
(74) *Attorney, Agent, or Firm* — Muirhead and Saturnelli, LLC

(57) ABSTRACT

A base station, a communication system and a time synchronization method between base stations are provided, which are capable of performing a time synchronization with another base station using a downlink signal of the other base station cell in which the own cell is located, without stopping transmission of the own base station even during operation. A base station receives a downlink signal that includes a downlink signal including a synchronization signal transmitted from the other base station and a downlink wraparound signal transmitted from own base station, removes an interference of the wraparound signal from the downlink received signal, with respect to a predetermined subframe in which the downlink wraparound signal from own base station interferes with the synchronization signal of the base station, among subframes of the downlink signal including the synchronization signal of the base station, performs a time synchronization processing with the base (Continued)

station by detecting a synchronization signal timing of the base station based on the downlink received signal from which the interference of wraparound signal is removed.

21 Claims, 27 Drawing Sheets

(52) U.S. Cl.
CPC ....... *H04W 56/001* (2013.01); *H04W 56/003* (2013.01); *H04L 5/0007* (2013.01)

(56) References Cited

U.S. PATENT DOCUMENTS

| | | | |
|---|---|---|---|
| 2013/0201960 A1* | 8/2013 | Kim ................. | H04W 74/0833 370/331 |
| 2015/0312870 A1* | 10/2015 | Koorapaty ........ | H04W 56/0015 370/350 |
| 2016/0219610 A1* | 7/2016 | Centonza ............. | H04W 48/00 |

OTHER PUBLICATIONS

Sho Nabatame, et al., "A Study on Network-Listening Based Synchronization with Loop-Back Self-Interference Canceller for LTE-Advanced," Research and Development Division, SoftBank Mobile Corp., Proceedings of the Society Conference of IEICE 2015, Aug. 25, 2015, p. 308, B-5-46.

Manabu Mikami, et al., "An Evaluation on Symbol Timing Detection Characteristics in Heterogeneous Networks," Wireless System Research Center, SoftBank Mobile Corp., Proceedings of the 2013 IEICE General Conference Tsushin 1, Mar. 5, 2013, p. 458, B-5-48.

Mitsukuni Konishi, et al., "An Experimental Evaluation on Network-Listening Based Synchronization with Loop-Back Self-Interference Avoidance Control for LTE-Advanced," 2015, Research and Development Division, SoftBank Mobile Corp., Nen Proceedings of the Society Conference of IEICE 1, Aug. 25, 2015, p. 307, B-5-45.

Sho Nabatame, et al., "Synchronization Performance Evaluation of Network-Listening Based Synchronization with Loop-Back Self-Interference Canceller Using Real Signal Waveform," IEICE Technical Report, Feb. 24, 2016, vol. 115, No. 472, pp. 121-126, RCS2015-353.

* cited by examiner

BASE STATION, COMMUNICATION SYSTEM AND TIME SYNCHRONIZATION METHOD BETWEEN BASE STATIONS

TECHNICAL FIELD

The present invention relates to a base station, a communication system and a time synchronization method between base stations in a mobile communication.

BACKGROUND ART

In order to cope with a rapid increase in traffic in a recent mobile communication system, a demand for a small-cell base station (also called such as "micro-cell base station", "pico-cell base station", "femto-cell base station", etc.), which forms a cell (radio communication area) smaller than a conventional macro-cell base station, is growing. Since the small-cell base stations are widely disposed in multiple stations as traffic countermeasures, it is expected that the small-cell base station is disposed in a macro cell of the conventional macro-cell base station and heterogeneous network (HetNet) of different cell-size mixed type is configured.

When a same frequency band is used in a macro cell and a small cell, there is a fear that an inter-cell interference occurs between the macro-cell base station and the small-cell base station. As a technique for reducing the inter-cell interference between the macro-cell base station and the small-cell base station, an inter-cell interference control technique in time domain (subframe unit) is known (for example, refer to Patent Literature 1), which is on the premise that the macro-cell base station and the small-cell base station are mutually synchronized in time. This inter-cell interference control technique is a technique conforming to the LTE (Long Term Evolution)-Advanced standards, and also called as "eICIC (enhanced Inter-Cell Interference Coordination)". In this inter-cell interference control technique, for example, the macro-cell base station sets a subframe group called as ABS (Almost Blank Subframe) in which a macro-cell base station does not perform a transmission of a signal (data signal, upper layer control signal) in a data channel (PDSCH: Physical Downlink Shared Channel) in downlink radio communication frame to a mobile station. The macro-cell base station performs a scheduling to determine a resource allocation for a subordinate mobile station (user terminal apparatus) based on the ABS pattern indicating the subframe group, and stops a transmission of the data signal and the upper-layer control signal to the mobile station based on the scheduling. Moreover, the ABS pattern indicating the subframe group, which is set by the macro-cell base station, is notified to the subordinate small-cell base station through a core network, etc. The small-cell base station performs a scheduling to determine a resource allocation to the subordinate mobile station (user terminal apparatus) based on the notified ABS pattern, and stops transmission of the data signal and the upper-layer control signal to the mobile station based on the scheduling. As stated above, by stopping the transmission of PDSCH based on the predetermined ABS pattern, the inter-cell interference in the data channel between the macro-cell base station and the small-cell base station can be mutually reduced.

CITATION LIST

Patent Literature

Patent Literature 1: Japanese Unexamined Patent Application Publication No. 2012-129793.

Non-Patent Literature

Non-Patent Literature 1: Mitsukuni Konishi, Daigo Ogata, Atsushi Nagate, Teruya Fujii, "One examination that relates to the listening synchronization using subframe shift in eICIC", The Institute of Electronics, Information and Communication Engineers (EIC), collected papers of society meeting 2014 (DVD), B-5-69, Sep. 9, 2014, The Institute of Electronics, Information and Communication Engineers.

SUMMARY OF INVENTION

Technical Problem

Since the interference is controlled on a time axis in the aforementioned inter-cell interference control technique, accurate time synchronization is necessary between the macro cell and small cell. As the time synchronization method, a network-listening based time synchronization method is attracting attention, in which the small-cell base station directly receives a macro cell signal, detects a transmission timing of the downlink signal of the macro cell and synchronizes a transmission timing of its own downlink signal at the detected transmission timing. Since this time synchronization method receives a macro-cell downlink signal that can be received even indoors and uses it for time synchronization, even when the small-cell base station is installed indoors, the time synchronization between the macro cell and the small cell is possible, unlike a case of time synchronization by receiving a signal such as a GPS signal that does not reach indoors. Moreover, since it is possible to directly receive a downlink signal of the macro cell and utilize the signal, there is also no constraint that all nodes need to support the predetermined protocol, unlike a packet-based time synchronization method between base stations by using a predetermined protocol such as an IEEE1588v2.

In the network-listening based time synchronization method, in order to keep the accuracy of time synchronization optimally at all times, it is preferable to receive periodically the macro-cell downlink signal and perform a synchronization processing even during operation of the small-cell base station. However, when trying to receive the macro-cell downlink signal during operation of the small-cell base station, there is a fear of interference between the macro-cell downlink signal and a signal (hereinafter called as "wraparound signal") that is transmitted from the small-cell base station and received by the small-cell base station itself. Since it is difficult to keep a sufficient distance between a transmitting antenna and a receiving antenna for a listening-synchronization in the small-cell base station, the received signal strength of the wraparound signal is much larger than the received signal strength of the macro-cell downlink signal. Therefore, when the wraparound signal interferes with the macro-cell downlink signal, the macro-cell downlink signal cannot be detected and the time synchronization becomes difficult.

As one of means to solve the problem of the aforementioned network-listening based time synchronization method, there is a wraparound-interference preventing technique in which the transmission from the small-cell base station itself is stopped at a timing of performing a listening-synchronization in the small-cell base station (for example, refer to Non-Patent Literature 1). However, in the wrap-around-interference preventing technique to partially stop the transmission, there is a problem that frequency utilization efficiency decreases, since a part of the signal transmission of the operating base station is partially stopped. Moreover, in the wraparound interference preventing technique to partially stop the transmission, since transmission of a synchronization signal that is a common signal cannot be stopped and it becomes indispensable to shift a subframe number of the small-cell base station, a flexible frame configuration of the downlink signal cannot be set.

The present invention has been made in view of the above described problem and an objective is to provide a base station, a communication system and a time synchronization method between base stations which are capable of performing a time synchronizing with another base station using a downlink signal of the other base station cell in which the own cell is located, without stopping a transmission of the own base station even during operation of the own base station.

Solution to Problem

A base station according to an aspect of the present invention is a base station comprises a radio communication section capable of performing a downlink signal transmission of an OFDM (Orthogonal Frequency Division Multiplexing) system to a mobile station, a transmission timing control section of controlling a transmission timing for the mobile station, and an own cell is located in a cell of another base station capable of performing a downlink signal transmission of the OFDM system to the mobile station. The base station comprises a downlink-signal receiving section of receiving a downlink signal that includes a downlink signal including a synchronizing signal transmitted from the other base station and a downlink wraparound signal transmitted from the own base station, an interference removing section of removing an interference of the wraparound signal from a receiving signal of the downlink signal, with respect to a predetermined subframe in which the downlink wraparound signal from the own base station interferes with the synchronization signal of the other base station, among subframes of the downlink signal including the synchronization signal of the other base station, and a synchronization processing section of performing a time synchronization processing with the other base station by detecting a timing of the synchronization signal of the other base station based on a received signal of the downlink signal from which an interference of the wraparound signal is removed.

In the foregoing base station, the interference removing section may remove a CP (cyclic prefix) from a received signal on a time axis of the downlink signal in accordance with a downlink signal transmission timing of the own base station, transform the received signal on the time axis, from which the CP is removed, to a received signal on a frequency axis by a Fourier transform, perform a channel estimation for the wraparound signal based on the received signal on the frequency axis, generate a replica on the frequency axis of the wraparound signal based on a result of the channel estimation and a known downlink signal transmitted from the own base station, and generate a received signal on the frequency axis, from which an interference of the wraparound signal is removed, by subtracting the replica on the frequency axis of the wraparound signal from the received signal on the frequency axis. The synchronization processing section may obtain a frequency response by multiplying the received signal on the frequency axis from which the interference of the wraparound signal by a complex conjugate of the synchronization signal of the other base station, obtain an impulse response by transforming the frequency response by an inverse Fourier transform, and detect a synchronization signal timing of the other base station based on the impulse response.

Furthermore, in the foregoing base station, the interference removing section may remove a CP (cyclic prefix) from a received signal on the time axis of the downlink signal in accordance with a downlink signal transmission timing of the own base station, transform the received signal on the time axis, from which the CP is removed, to a received signal on the frequency axis by a Fourier transform, perform a channel estimation for the wraparound signal based on the received signal on the frequency axis, generate a replica on the frequency axis of the wraparound signal based on a result of the channel estimation and a known downlink signal transmitted from the own base station, generate a received signal on the frequency axis, from which an interference of the wraparound signal is removed, by subtracting the replica on the frequency axis of the wraparound signal from the received signal on the frequency axis, and transform the received signal on the frequency axis by an inverse Fourier transform, and generate a received signal on the time axis from which an interference of the wraparound signal is removed. The synchronization processing section may obtain a cross correlation value by multiplying the received signal on the time axis, from which the interference of the wraparound signal is removed, by a complex conjugate of the synchronization signal of the other base station, and detect a synchronization signal timing of the other base station based on the cross correlation value.

Moreover, in the foregoing base station, the interference removing section may remove a CP (cyclic prefix) from a received signal on the time axis of the downlink signal in accordance with a downlink signal transmission timing of the own base station, transform the received signal on the time axis, from which the CP is removed, to a received signal on the frequency axis by a Fourier transform, perform a channel estimation for the wraparound signal based on the received signal on the frequency axis, generate a replica on the frequency axis of the wraparound signal based on a result of the channel estimation and a known downlink signal transmitted from the own base station, generate a replica on the time axis of the wraparound signal by transforming the replica on the frequency axis of the wraparound signal by an inverse Fourier transform, add the CP to the replica of the wraparound signal on the time axis, and generate a received signal on the time axis, from which an interference of the wraparound signal is removed, by subtracting the replica on the time axis of the wraparound signal, to which the CP is added, from the received signal on the time axis. The synchronization processing section may obtain a cross correlation value by multiplying the received signal on the time axis, from which an interference of the wraparound signal is removed, by a complex conjugate of the synchronization signal of the other base station, and detect a synchronization signal timing of the other base station based on the cross correlation value.

Herein, the radio communication section may comprise one or plural antennas and may be configured so as to transmit a downlink signal including a cell reference signal from each antenna, and the interference removing section may perform the channel estimation for each of one or plural transmission paths of the downlink signal transmitted by each of the one or plural antennas, base on the cell reference signal included in each of one or plural downlink signals transmitted from each of the one or plural antennas.

Further, the radio communication section may comprise one or plural antennas and may be configured so as to transmit a downlink signal including a synchronization signal from each antenna, and the interference removing section may perform the channel estimation for a downlink signal commonly transmitted to the one or plural antennas, base on the synchronization signal included in commonly in one or plural downlink signals transmitted from each of the one or plural antennas.

Furthermore, the interference removing section may perform the channel estimation based on a cell reference signal or a synchronization signal including in a subframe that the other base station does not transmit, among subframes in each of the one or plural downlink signals transmitted by each of the one or plural antennas.

Moreover, the interference removing section may perform the Fourier transform with respect to the received signal of the downlink signal transmitted from the own base station and a head position of time window of the Fourier transform may be set at a timing earlier than the downlink signal transmitting timing, and the head position of time window may be located within the CP before an effective symbol in OFDM symbols of the downlink signal.

Further, in the foregoing base station, the interference removing section may obtain an impulse response by calculating a cross correlation function between the received signal on the time axis of the downlink signal and the downlink signal transmitted from the own base station, generate a replica on the time axis of the wraparound signal based on the impulse response and a known downlink transmitting signal transmitted from the own base station, and generate a received signal on the time axis, from which an interference of the wraparound signal is removed, by subtracting the replica on the time axis of the wraparound signal from the received signal on the time axis. The synchronization processing section may obtain a cross correlation value by multiplying the received signal on the time axis generated in the interference removing section by a complex conjugate of the synchronization signal of the other base station, and detect a synchronization signal timing of the other base station based on the cross correlation value.

A base station according to another aspect of the present invention is a base station that comprises a radio communication section capable of performing a downlink signal transmission of an OFDM (Orthogonal Frequency Division Multiplexing) system to a mobile station, a transmission timing control section of controlling a transmission timing to the mobile station, and an own cell is located in a cell of another base station capable of performing a downlink signal transmission of the OFDM system to the mobile station. The transmission timing control section controls so as to stop a downlink signal transmission, with respect to a predetermined subframe in which a downlink wraparound signal from the own base station interferes with a synchronization signal of the other base station, among subframes of the downlink signal including the synchronization signal of the other base station. The base station further comprises a downlink signal receiving section of receiving a downlink signal including a synchronization signal transmitted from the other base station, a receiving apparatus section of directly receiving a transmitter noise from the radio communication section by a wired communication link and transforming an analog signal of the received transmitter noise to a digital signal, an interference removing section of removing an interference of the transmitter noise from the received signal of the downlink signal with respect to the predetermined subframe based on the transmitter noise obtained by the receiving apparatus section, and a synchronization processing section of performing a time synchronization processing with the other base station by detecting a synchronization signal timing of the other base station based on the received signal of the downlink signal from which the interference of the transmitter noise is removed.

Furthermore, a communication system according to still another aspect of the present invention comprises a base station in any one of the foregoing aspects and another base station corresponding to a cell in which a cell of the base station in any one of the foregoing aspects is located.

Moreover, a time synchronization method between base stations according to still another aspect of the present invention is a time synchronization method synchronizing between a first base station capable of performing a downlink signal transmission of an OFDM (Orthogonal Frequency Division Multiplexing) system to a mobile station and a second base station capable of performing downlink signal transmission of an OFDM system to a mobile station, and an own cell of the second base station is located in a cell of the first base station. The second base station receives a downlink signal including a downlink signal including a synchronization signal transmitted from the first base station and a downlink wraparound signal transmitted from the own base station, removes an interference of the wraparound signal from a received signal of the downlink signal with respect to a predetermined subframe in which the downlink wraparound signal from the own base station interferes the synchronization signal of the first base station among subframes of the downlink signal including the synchronization signal of the first base station, and performs a time synchronization processing with the first base station by detecting a synchronization signal timing of the first base station based on a received signal of the downlink signal from which the interference of the wraparound signal is removed.

Further, a time synchronization method between base stations according to still another aspect of the present invention is a time synchronization method synchronizing between a first base station capable of performing a downlink signal transmission of an OFDM (Orthogonal Frequency Division Multiplexing) system to a mobile station and a second base station capable of performing a downlink signal transmission of the OFDM system to a mobile station, and an own cell of the second base station is located in a cell of the first base station. The second base station controls to stop a downlink signal transmission with respect to a predetermined subframe in which a downlink wraparound signal from an own base station interferes a synchronization signal of the first base station among subframes of the downlink signal including the synchronization signal of the first base station, directly receives a residual transmitting signal corresponding to a transmitter noise transmitted from a radio communication section of the own base station by a wired communication link even in a timing of stopping the downlink signal transmission of the own base station, acquires a complex baseband signal by converting from the received residual transmitting signal, receives a downlink signal including a synchronization signal transmitted from the first base station, generates a replica signal of the residual transmitting signal with respect to the predetermined subframe based on the acquired complex baseband signal, removes an interference of the residual transmitting signal from a received signal of the downlink signal, and performs a time synchronization processing with the first base station by detecting a synchronization signal timing of the first base station based on a received downlink signal from which the interference of the transmitter noise is removed.

It is noted that, each of the base stations (own base station) according to the aspect of the present invention may be a small-cell base station, and the other base station may be a macro-cell base station. In the foregoing communication system, the base station of each of the aspects may be a small-cell base station, and the other base station may be a macro-cell base station. Moreover, in each of the time synchronization methods between base stations according to the aspect of the present invention, the second base station may be a small-cell base station, and the first base station may be a macro-cell base station.

Advantageous Effects of Invention

According to the present invention, it is capable of timely synchronizing with another base station using a downlink signal of the other base station cell in which an own cell is located, without stopping transmission of an own base station even during operation of the own base station.

DESCRIPTION OF EMBODIMENTS

Hereinafter, various embodiments of the present invention will be described with reference to the drawings. Here, although an embodiment of the present invention will be described subject to applicability to LTE/LTE-Advanced, a concept of the present invention can be applied to any systems using a similar cell configuration and physical channel configuration.

At first, an overall configuration of a mobile communication system capable of applying the present invention will be described.

Figure 1:
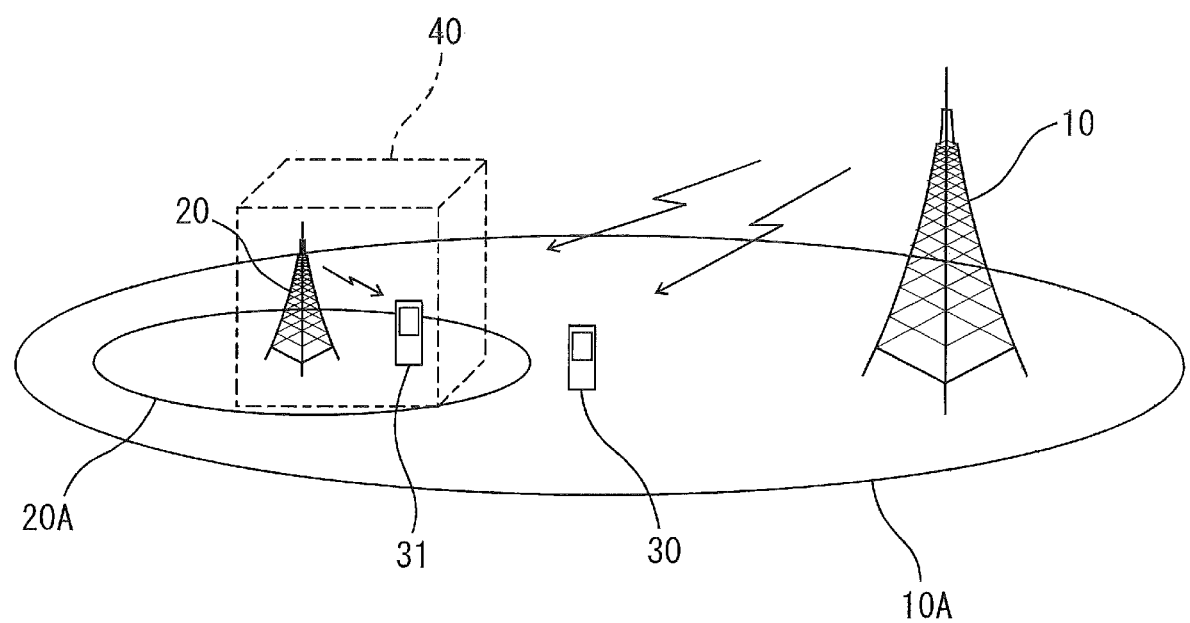
FIG. 1 is an illustration showing one example of a schematic configuration of a mobile communication system with a macro-cell base station and a small-cell base station according to an embodiment of the present invention.

FIG. 1 is an illustration showing a schematic configuration of a mobile communication system in which a macro-cell base station and a small-cell base station are located according to an embodiment of the present invention.

In FIG. 1, the mobile communication system of the present embodiment is a communication system conforming to the standard specification of LTE (Long Term Evolution)/LTE-Advanced, and includes a macro-cell base station 10 being as a first base station, and a small-cell base station 20 being as a second base station located in the cell (hereinafter called appropriately as "macro cell") 10A that is a radio communication area of the macro-cell base station 10. A cell (hereinafter called appropriately as "small cell") 20A that is a radio communication area of the small-cell base station 20 is included in the cell 10A of the macro-cell base station 10. Since the macro cell 10A is outdoors mainly, the macro cell 10A is also called as outdoor macro cell.

In recent years, in large urban areas, since communication traffic is increasing rapidly in indoor offices of middle to high-rise buildings, means of transporting a communication traffic even in a height direction in high efficiency are demanded. Therefore, a three-dimensional space cell configuration is effective, in which the small-cell base station 20 is disposed in a three-dimensionally including the height directional within the house 40 such as a building located in the macro cell 10A.

In FIG. 1, the user terminal apparatus (UE: User Equipment) 30 as a first mobile station is a user terminal apparatus (MUE) connected with the macro-cell base station 10 locating in the macro cell 10A of the macro-cell base station 10, and is in a state capable of performing a radio communication for a telephone or data communication, etc. via the macro-cell base station 10. Since this user terminal apparatus 30 is located at a position near the boundary portion between the macro cell 10A and the small cell 20A, the user terminal apparatus 30 is in a situation susceptible to interference from the small cell 20A.

The user terminal apparatus (UE) 31 as a second mobile station is a user terminal apparatus (SUE) connected with the small-cell base station 20 locating in an outer edge portion of the cell 20A of the small-cell base station 20 installed in the house 40, and is in a state capable of radio communication for a telephone or data communication, etc. via the small-cell base station 20. Since this user terminal apparatus 31 is located at a position near the boundary portion between the small cell 20A and the macro cell 10A, the user terminal apparatus 31 is in a situation susceptible to interference from the macro cell 10A.

When locating in the macro cell 10A or the small cell 20A, the user terminal apparatus 30 and 31 can perform a radio communication with a macro-cell base station or a small-cell base station corresponding to the cell in which the user terminal apparatus locates, by using a predetermined communication system and radio communication resource. The user terminal apparatus 30 and 31 is configured with, for example, hardware such as a computer apparatus having a CPU, a memory, etc., an external communication interface section for a core network, a radio communication section, etc. and can perform a radio communication with the base stations 10 and 20 etc. by executing a predetermined program.

The macro-cell base station 10 is a base station for wide area that covers a macro cell being as a normal wide area with a radius from about several hundred meters to several kilometers, which may be referred to as "macro-cell base station", "Macro e-Node B", "MeNB", or the like. The macro-cell base station 10 is connected to other base stations with, for example, a wired communication link and can communicate via a predetermined communication interface. Moreover, the macro-cell base station 10 is also connected to a core network of the mobile communication network via a line-termination unit and a communication line such as a leased line, and can communicate with various types of nodes such as a server apparatus 40 on the core network by a predetermined communication interface.

Unlike the macro-cell base station for wide area, the small-cell base station 20 is a small-capacity base station that can be disposed indoors of the house 40 such as an ordinary home, shop, office, etc. and has a radio-communication range of about several meters to several hundred meters. Since the small-cell base station 20 is disposed so as to cover an area smaller than the area covered by the macro-cell base station for wide area in the mobile communication network, the small-cell base station may be referred to as "Small base station", "Small e-Node B", "Small eNB", or the like. The small-cell base station 20 is also connected to the core network of the mobile communication network via a line-termination unit and a communication line such as a public board-band communication line including an ADSL (Asymmetric Digital Subscriber Line), an optical line, etc. and can communicate with various types of nodes such as a server apparatus on the core network by a predetermined communication interface.

The base station of each of the macro-cell base station 10 and the small-cell base station 20 is configured with, for example, hardware such as a computer apparatus having a CPU, a memory, etc., an external communication interface section for a core network, a radio communication section, etc. and can perform various types of processing to suppress an interference as stated below and can perform a radio communication with the user terminal apparatuses 30 and 31 by using a predetermined communication system and a radio communication resource by executing a predetermined program.

Each of the base stations 10 and 20 is a base station capable of downlink radio communication of the OFDM (Orthogonal Frequency Division Multiplexing) system to the user terminal apparatus as a mobile station. Each of the base stations 10 and 20 is provided with, for example, an antenna, a radio signal path switching section, a transmission and reception sharing device (DUP: Duplexer), a downlink radio receiving section, an OFDM (Orthogonal Frequency Division Multiplexing) demodulation section, an uplink radio receiving section and a SC-FDMA (Single-Carrier Frequency-Division Multiple Access) demodulation section, etc. Furthermore, each of the base stations 10 and 20 is provided with an OFDM modulation section, a downlink radio transmitting section and a control section, etc.

The SC-FDMA demodulation section performs a demodulation process with the SC-FDMA system for a received signal received by the uplink radio receiving section, and passes the demodulated data to the control section. The OFDM modulation section receives a data of downlink signal to be transmitted to the user terminal apparatus locating in the cell of its own base station, from the control section, and modulates the data with the OFDM system so as to be transmitted with a predetermined electric power. Moreover, when the base station, for example, receives information on a target subframe to be stopped for transmission, from the server apparatus, the OFDM modulation section is controlled so as to stop the downlink transmission only for the specific subframe in a radio communication frame. The downlink radio transmitting section transmits a transmitting signal modulated by the OFDM modulation section via the transmission and reception sharing device, the radio signal path switching section and the antenna.

The control section of the base stations 10 and 20 is configured with, for example, a computer apparatus, controls each section, and performs various kinds of processes by loading and executing a predetermined program. Furthermore, the control section cooperates with the external communication interface section and also functions as means of receiving ABS pattern information that is information on a target subframe to be stopped for transmission, from the server apparatus. Moreover, the control section also functions as means of controlling so as to stop a downlink transmission in the specific target subframe to be stopped for transmission, based on the information (ABS pattern information) on the target subframe for stopping transmission which is received from the server apparatus.

The control section of the small-cell base station 20 among the aforementioned base stations 10 and 20 functions as means of time synchronization processing between the macro-cell base station 10 based on a synchronization signal received from the macro-cell base station 10. It is noted that the time synchronization processing in the small-cell base station 20 will be described below.

It is noted that, although the macro-cell base station 10 and the small-cell base station 20 are shown one by one in FIG. 1, the number of the macro-cell base station 10 and the small-cell base station 20 may be plural, respectively. Furthermore, although the user terminal apparatus located in each of the macro cell 10A and the small cell 20A is shown one by one in FIG. 1, a plurality of the user terminal apparatus may be located in each of the cells 10A and 20A.

In a mobile communication system according to the present embodiment, a sever apparatus capable of communicating with each of the base station 10 and 20 via a communication line may be provided. This server apparatus is also called SON (Self-Organizing Network) server, and configured with, for example, hardware such as a computer apparatus having a CPU, memories, etc., an external communication interface section for the core network. The server apparatus is capable of communicating with the macro-cell base station 10 and the small-cell base station 20 via the predetermined communication line, by executing a predetermined program. Furthermore, the computer apparatus of the server apparatus functions as means of determining whether it is necessary to stop a downlink transmission from the macro-cell base station 10 of an interference source with respect to at least one subframe within a radio communication frame of the downlink transmission to the user terminal apparatus based on information on an interference signal level received from the interfered small-cell base station 20. Moreover, the computer apparatus of the server apparatus also functions as means of determining at least one target subframe to be stopped for transmission within the radio communication frame, when determining that it is necessary to stop the downlink transmission. The computer apparatus of the server apparatus also cooperates with the external communication interface section and functions as means of receiving the information on interference signal level in the interfered small-cell base station 20, and as means of transmitting information on the determined target subframe to be stopped for transmission to the macro-cell base station 10 of the interference source.

Then, an inter-cell interference control will be described in the mobile communication system of the constitution described above.

As described above, as a countermeasure for the rapid traffic increase in the mobile communication, it is effective to apply an overlay cell configuration in which the small cell 20A is superimposed on the macro cell 10A. However, when the macro cell 10A and the small cell 20A use the same one frequency band in the overlay cell configuration, since an interference between the macro cell 10A and the small cell 20A occurs, it is necessary to control the interference to maximize an effect of the application of the overlay cell configuration. For an interference control method, an eICIC (enhanced Inter-Cell Interference Coordination) technique on the basis of the LTE-Advanced standards is effective.

Figure 2:
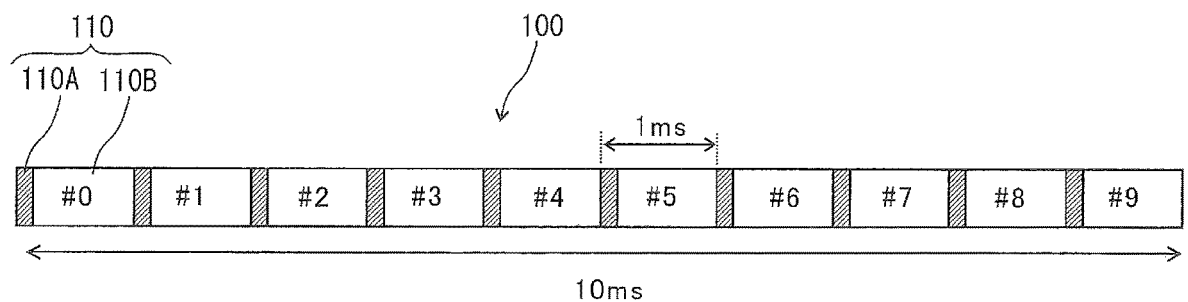
FIG. 2 is an illustration showing an example of a format in a time axis direction of a radio communication frame of an LTE downlink.
Figure 3:
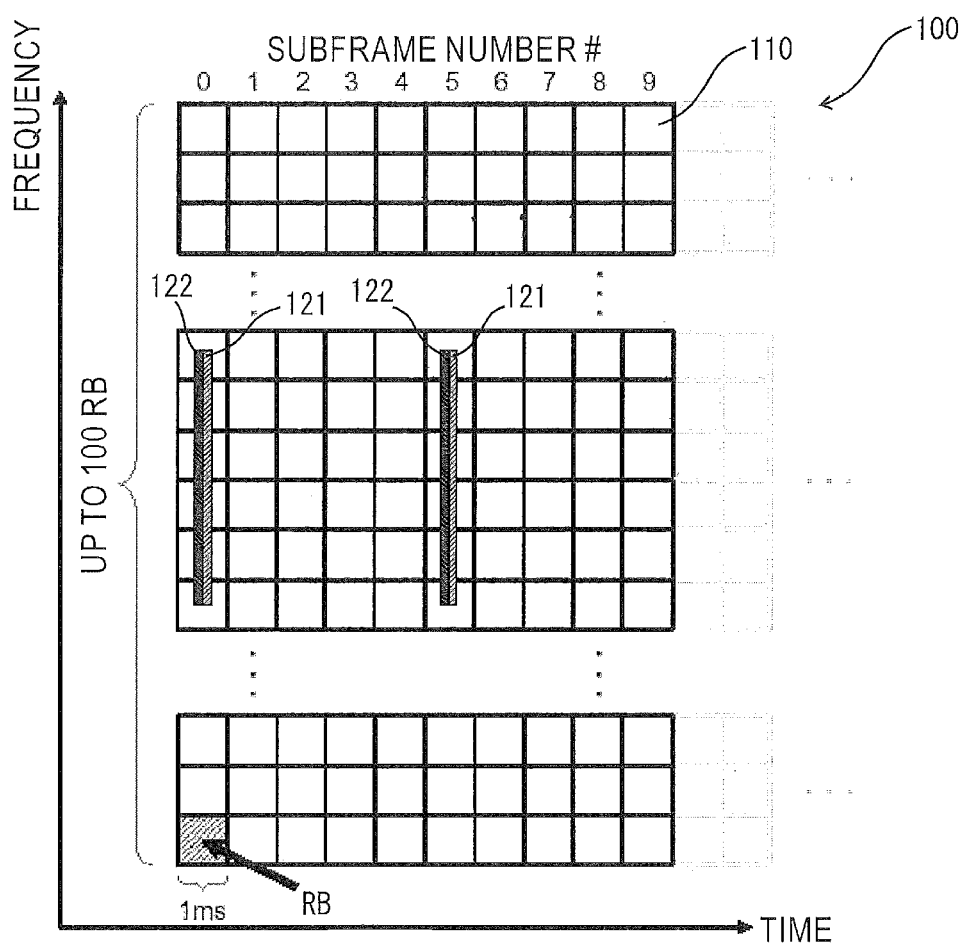
FIG. 3 is an illustration showing an example of a format in a time axis and a frequency axis direction of a radio communication frame of an LTE downlink.

FIG. 2 is an illustration showing an example of a format in a time axis direction of a radio communication frame of a LTE downlink. FIG. 3 is an illustration showing an example of a format in a time axis and frequency axis direction of a radio communication frame of an LTE downlink.

As shown in FIG. 2, the radio communication frame 100 with a predetermined length (10 [ms] in the illustrated example), which is one unit of an LTE downlink signal, is configured with a predetermined number of subframes 110 (ten subframes in the illustrated example) of a predetermined respective length (1.0 [ms] in the illustrated example). Since a TTI (Transmission Time Interval), which is the minimum unit of time for scheduling of the LTE downlink, is 1 subframe, for each subframe, a resource block (RB), which is the minimum unit of radio resource, is allocated to the scheduled user terminal apparatus. Each subframe 110 has a control channel area 110A and a data channel area 110B as described below.

As shown in FIG. 3, in each subframe 110, up to 100 resource blocks (RBs) are allocated in the frequency axis direction. In 6 RBs of the center portion in the frequency axis direction of the first (#0) and sixth (#5) subframes from the head, as described below, a primary synchronization signal (PSS) 121 and a secondary synchronization signal (SSS) 122 are arranged.

In the radio communication frame 100 in FIG. 2, for each of the second (#1), third (#2), fourth (#3), seventh (#6), eighth (#7) and ninth (#8) arrangement positions from the head, it is capable of setting an MBSFN (Multimedia Broadcast multicast service Single Frequency Network) subframe on the basis of the LTE-Advanced standards. In the MBSFN subframe, by setting the MBSFN frame to be ABS, a transmission of a cell-specific reference signal (CRS) can be stopped except for a head OFDM symbol. This subframe in which a transmission of a cell-specific reference signal (CRS) can be stopped is the MBSFN subframe conforming to the LTE-Advanced standards. For each of other arrangement positions of the radio communication frame 100, that is, the first (#0), fifth (#4), the sixth (#5) and tenth (#9) arrangement positions from the head, it is not capable of setting the MBSFN subframe, and the transmission of the reference signal (CRS) cannot be stopped.

Figure 4:
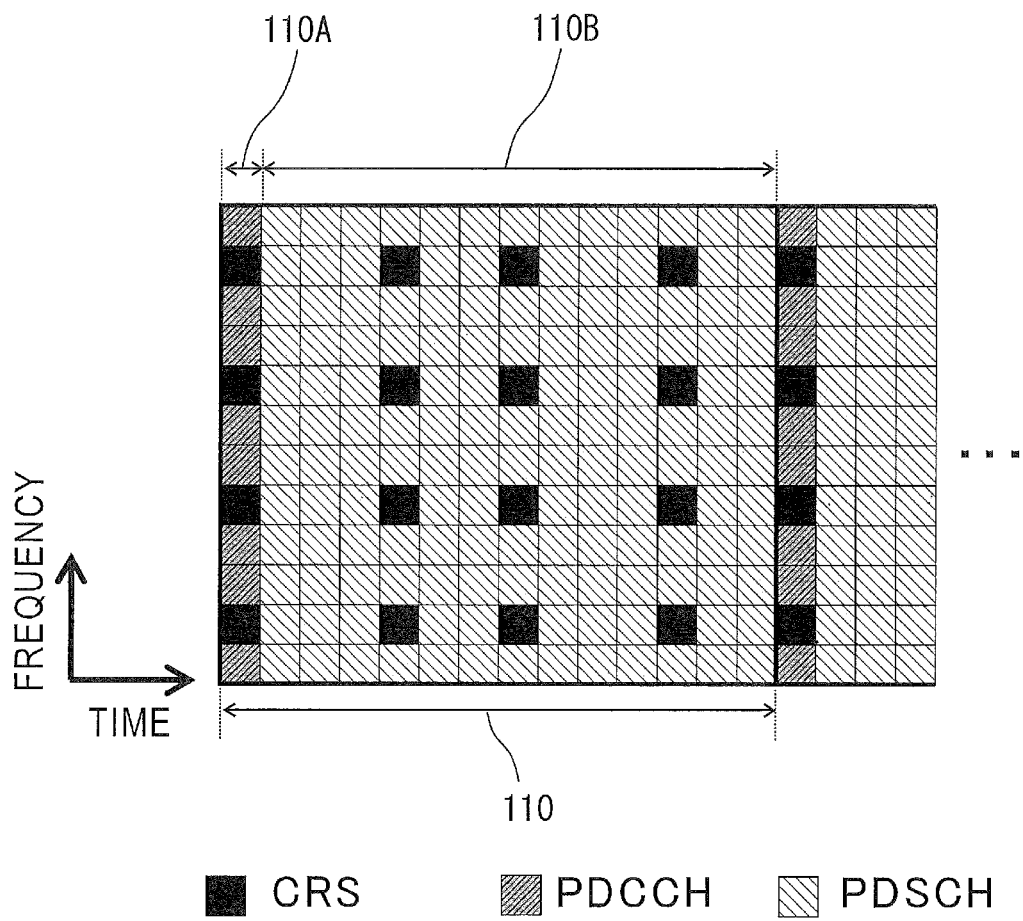
FIG. 4 is an illustration showing an example of a format of a subframe forming a radio communication frame.

FIG. 4 is an illustration showing an example of a format of a subframe forming a radio communication frame. In FIG. 4, each subframe 110 is configured with, for example, a total of 168 REs (Resource Elements) consisting of 12 subcarriers (15 [kHz]) in the frequency axis direction and 14 OFDM symbols in the time axis direction. It is noted that, when the Extended Cyclic Prefix is used, 120 OFDM symbols are transmitted in one subframe. Herein, "symbol" is one unit of information transmitted by radio communication. One symbol is generated by one modulation of information to be transmitted, and the information amount (the number of bits) of one symbol is determined by the modulation system. Scheduling for defining that which frequency/time resource is mapped for respective user terminal apparatus, what type of modulation format (modulation system, coded rate) is used in data signal to respective user terminal apparatus, etc. is performed for each subframe, and the result of scheduling is notified to the user terminal apparatus.

As shown in FIG. 4, each subframe 110 has a control channel area 110A of the head portion in which a RE for downlink L1/L2 control channel signal is mapped, and a data channel area 110B in which a RE for data channel signal and upper control channel signal is mapped. It is noted that, in the control channel area 110A, 1 to 3 OFDM symbols of the head of the subframe can be allocated.

In the control channel area 110A of the subframe 110, a PDCCH (Physical Downlink Control Channel) being as an L1/L2 control channel is set. The PDCCH is used for transmission of the control information (DCI: Downlink Control Information) such as a determination of scheduling for uplink and downlink, and a power control command for uplink, etc. The DCI includes an allocation of downlink scheduling including control information on a PDSCH resource designator, a transmission format, HARQ information, and a spatial multiplex. The DCI also includes an uplink-scheduling grant as a PUSCH resource designator, a transmission format HARQ-related information and uplink scheduling information.

In the data channel area 110B of the subframe 110, a physical downlink shared channel (PDSCH: Physical Downlink Shared Channel) is set. The PDSCH is a physical channel transmitting a downlink data, and supports a MIMO multiplexing of up to 4 layers in LTE and a MIMO multiplexing of up to 8 layers in LTE-Advanced, in addition to a MIMO diversity as a MIMO transmission system. An SIB being as broadcast information other than an MIB, paging information being as a paging upon incoming call, and other upper-layer control messages such as control information of an RRC (Radio resource Control protocol) layer are also transmitted by the PDSCH. The user terminal apparatus decodes the PDSCH based on information such as a radio resource allocation position, a modulation system and a data size (TB: Transport Block size).

In LTE, cell-specific reference signals (CRSs) are dispersed and regularly arranged in the 1st, 5th, 8th and 12th OFDM symbols among the 14 OFDM symbols in time domain in the subframe 110. This reference signal CRS plays two roles as a reference signal for measuring channel state information (CSI: channel state information) and a reference signal for data demodulation in the user terminal apparatus. Depending on a cell ID, different scrambling and frequency shift of subcarrier positions to be mapped are applied to the reference signal CRS. As described above, the transmission of reference signal CRS mapped in the normal subframe cannot be stopped by the ABS, and the transmission of reference signal CRS other than head mapped in the MBSFN subframe can be stopped by the ABS.

Figure 5:
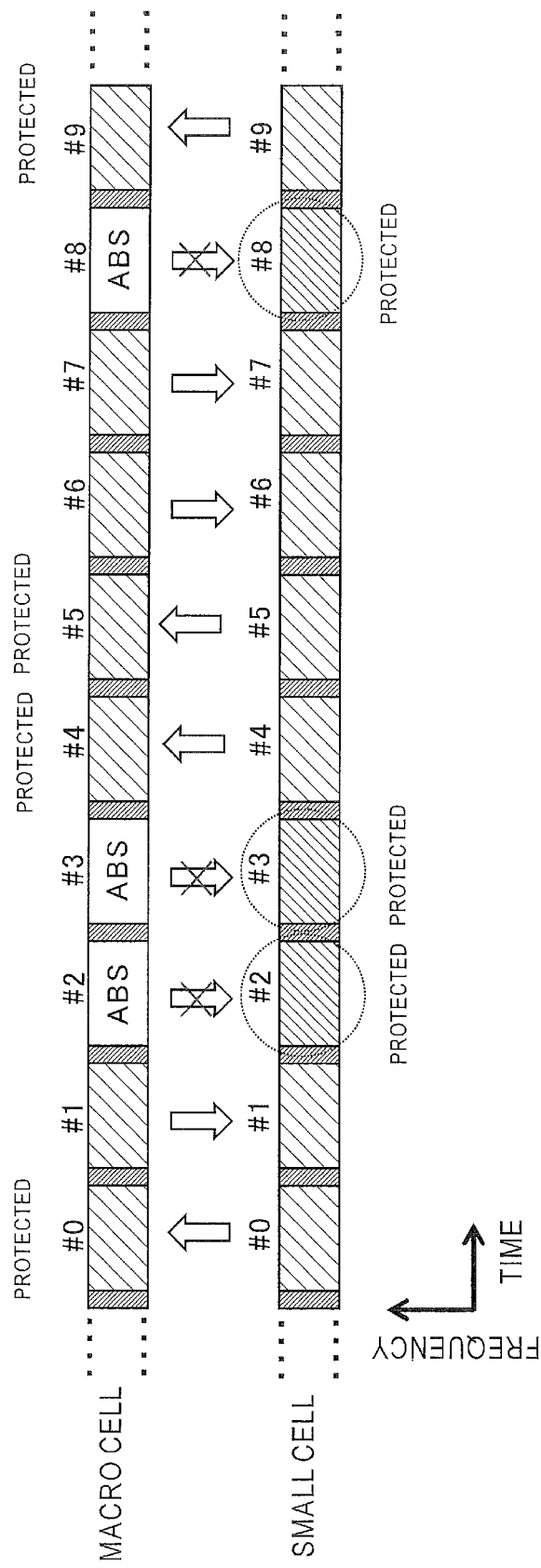
FIG. 5 is an illustration showing an example of a situation of transmission stops in a subframe by ABS used in an inter-cell interference control technique (eICIC).
Figure 6:
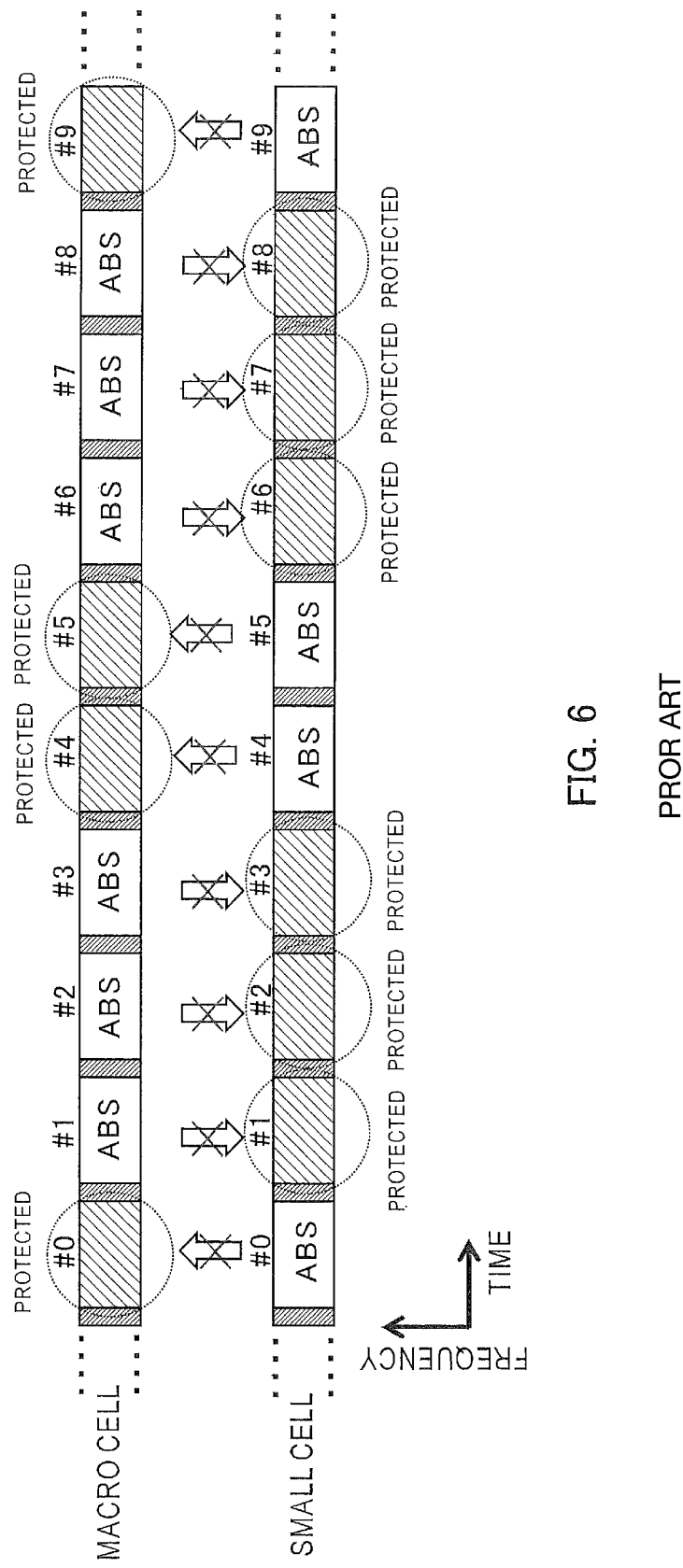
FIG. 6 is an illustration showing another example of a situation of transmission stops in a subframe by ABS used in an inter-cell interference control technique (eICIC).

FIG. 5 and FIG. 6 are respectively an illustration showing an example of a situation of stopping transmission according to a subframe by ABS used in an inter-cell interference control technique (eICIC). In the eICIC, for example as shown in FIG. 5 and FIG. 6, it is capable of reducing an interference of data channel in the user terminal apparatus connected to the small cell, by setting the ABSs in part of subframes (subframes #1 to #3 and #6 to #8 in the illustrated example) of the macro cell and stopping the data channel (PDCCH) signal transmission. Moreover, for example, as shown in FIG. 6, it is capable of reducing an interference of data channel in the user terminal apparatus connected to the macro cell, by setting the ABSs similarly in part of subframes (subframes #0, #4, #5 and #9 in the illustrated example) of the small cell.

Figure 7:
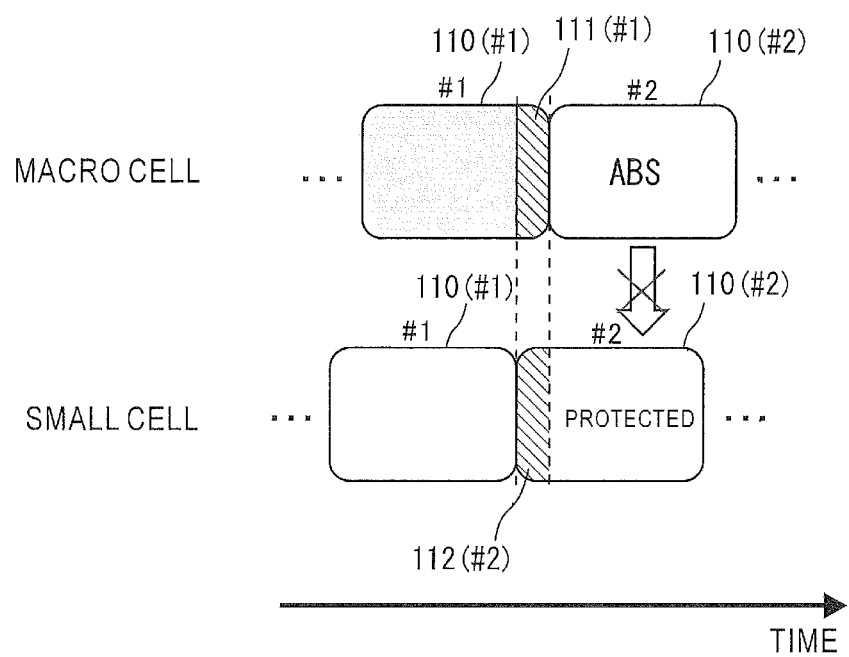
FIG. 7 is an illustration showing an example of a situation of an interference in case that the time synchronization is incomplete between a macro cell and a small cell.

FIG. 7 is an illustration showing an example of a situation of an interference in case that the time synchronization is incomplete between the macro cell 10A and the small cell 20A. In the inter-cell interference control technique (eICIC), since an interference is controlled on the time axis, an accurate time synchronization with high accuracy is required between the macro cell 10A and the small cell 20A is required. For example, it is necessary to perform a time synchronization with a time accuracy of 1 [μs] or less. If the time synchronization between the macro cell 10A and the small cell 20A is incomplete, for example as shown in FIG. 7, the rear end part 111 (#1) of the subframe 110 (#1) just before the subframe 110 (#2) in which an ABS is set in the macro cell 10A, and the front end part 112 (#2) of the target subframe 110 (#2) to be protected of the small cell 20A interfere with each other. That is to say, when the front end part 112 (#2) of the subframe 110 (#2) of the LTE downlink transmitted from the small-cell base station 20 is receiving by the user terminal apparatus 31, the rear end part 111 (#1) of the subframe 110 (#1) of the LTE downlink transmitted from the macro-cell base station 10 reaches the user terminal apparatus 31 and interferes therewith.

Figure 8A:
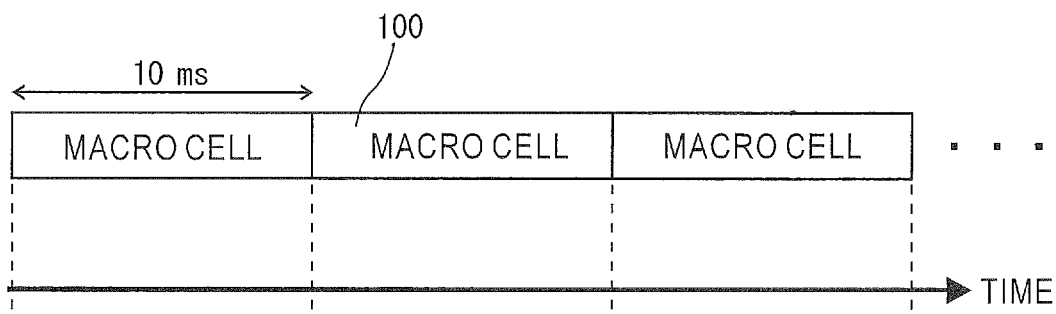
FIG. 8A is an illustration showing an example of a network-listening • based time synchronization method used in a mobile communication system according to the present embodiment.
Figure 8B:
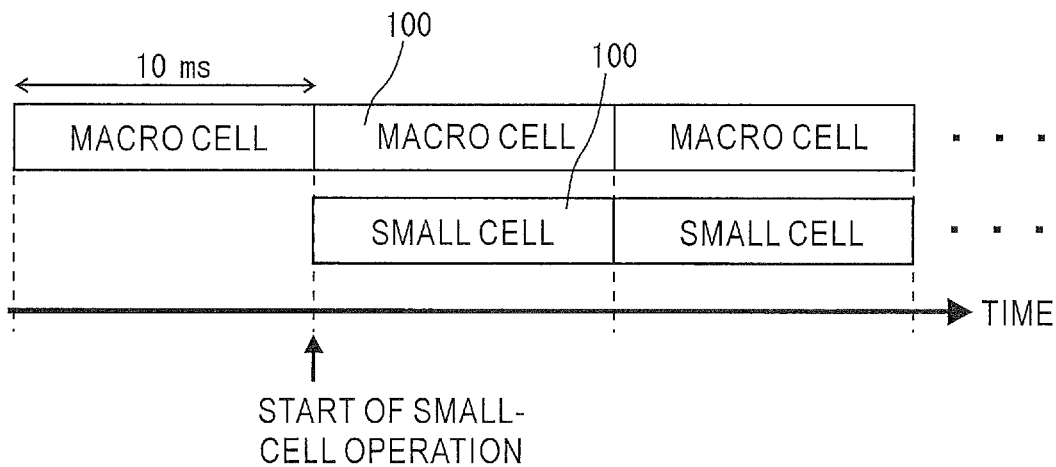
FIG. 8B is an illustration showing an example of a network-listening • based time synchronization method used in a mobile communication system according to the present embodiment.

FIG. 8A and FIG. 8B are illustration showing an example of a network-listening • based time synchronization method (hereinafter called as "listening-synchronization method") used in a mobile communication system according to the present embodiment. In this listening-synchronization method, the small-cell base station 20 directly receives a signal of the macro cell 10A, and detects (listens) a transmission timing of the radio communication frame 100 of the downlink signal of the macro cell 10A as shown in FIG. 8A. The small-cell base station 20, as shown in FIG. 8B, synchronizes a transmission timing of the radio communication frame 100 of the downlink signal of own small cell 20A to the detected transmission timing of the radio communication frame 100 of the macro cell 10A.

In the listening-synchronization method, since the downlink signal of the macro cell 10A, which can be also received indoor, is received and used for time synchronization, even when the small-cell base station 20 is disposed indoors, unlike a case to performing a time synchronization by receiving a signal such as a GPS signal that does not reach indoor, it is capable of performing a time synchronization between the macro cell 10A and the small cell 20A. Moreover, since a downlink signal of the macro cell 10A can be directly received and used, unlike a packet-based time synchronization method between base stations by using a predetermined protocol specified in the IEEE1588v2, etc., there is no restriction that all nodes in the communication between base stations need to support the foregoing predetermined protocol.

Figure 9:
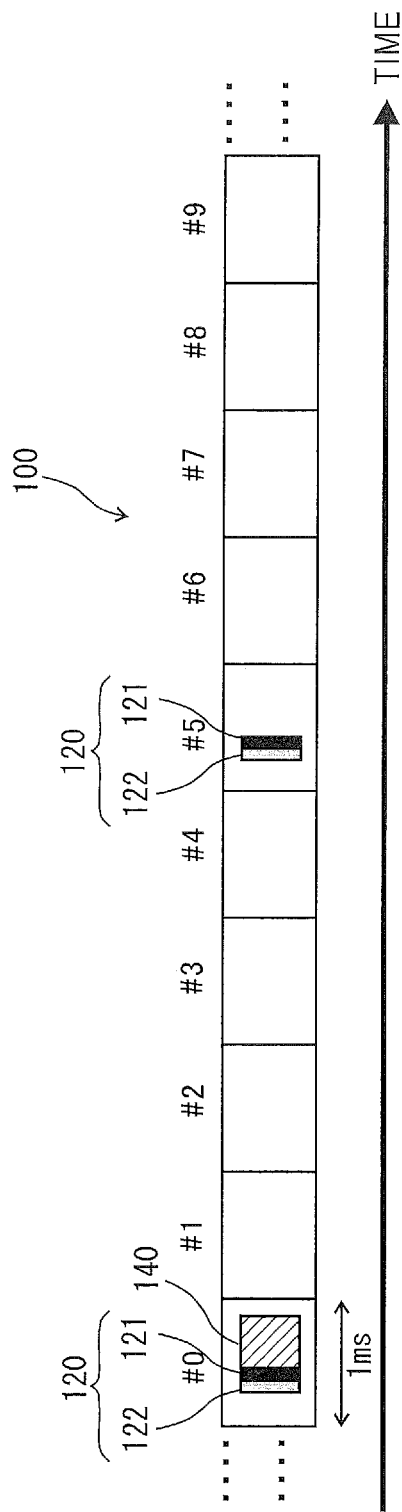
FIG. 9 is an illustration showing an example of arrangement synchronization signals (PSS, SSS) of a macro cell using in a listening-synchronization method according to the present embodiment.

FIG. 9 is an illustration showing an example of an arrangement of synchronization signals (PSS, SSS) of the macro cell 10A using in the listening-synchronization method according to the present embodiment. Candidates of reception targets received by the foregoing listening-synchronization method include a synchronization signal (PSS, SSS) 120, a broadcast signal (PBCH) 140, a cell-specific reference signal (CRS), etc. which are periodically transmitted from the macro-cell base station 10 to the user terminal apparatus in LTE. In the present embodiment, the synchronization signal (PSS. SSS) 120 capable of performing a signal processing more easily among these signals is used. This synchronization signal 120 comprises a primary synchronization signal (PSS) 121 and a secondary synchronization signal (SSS) 122 as shown in FIG. 9, for example, and is respectively arranged at the 6RB of the central part in the frequency axial direction of each of the first (#0) and the sixth (#5) subframes. Moreover, the synchronization signal 120 is configured with two phases of the PSS 121 and the SSS 122, and is used for synchronization when the user terminal apparatus performs an initial access to the base station. The downlink signal including the synchronization signal 120 of the macro cell 10A, for example, is received by a downlink signal receiving section (listening apparatus) 250 described below as means of synchronization signal receiving provided in the small-cell base station 20, and is sent to the small-cell base station 20 and used for time synchronization process.

Figure 10:
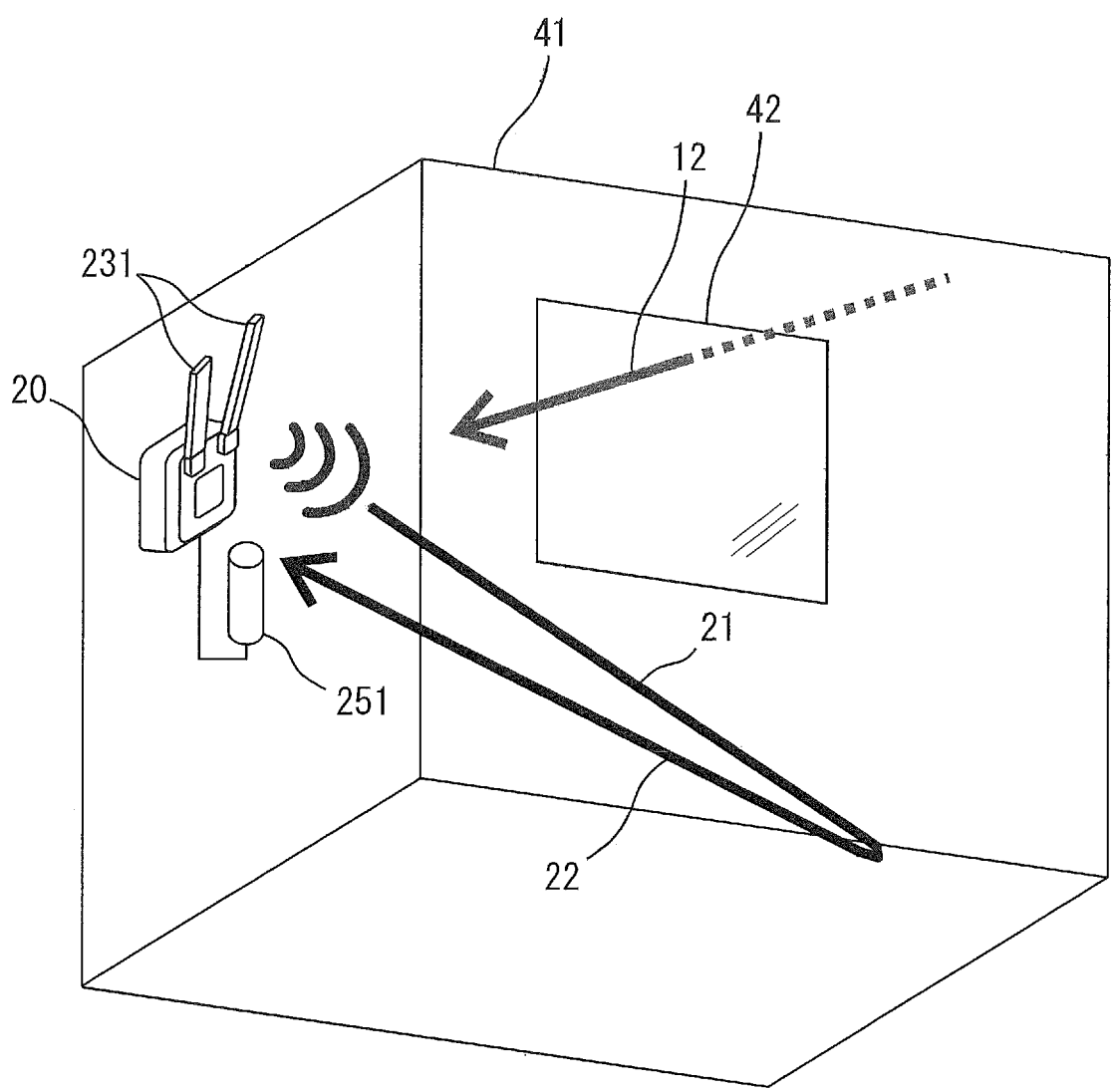
FIG. 10 is an illustration explaining a problem when receiving a synchronization signal of a macro cell by a listening-synchronization method and performing a time synchronization.
Figure 11:
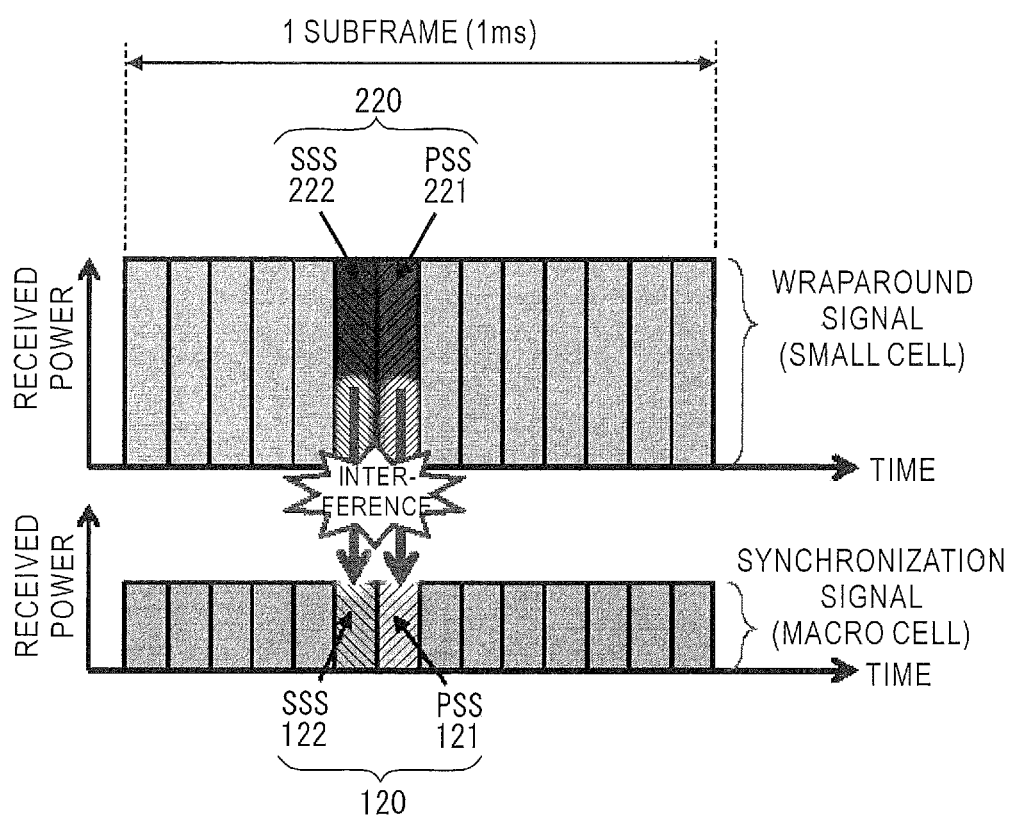
FIG. 11 is an illustration showing an example of a situation of an interference between a synchronization signal of a macro cell and a synchronization signal included in a wraparound signal of a small cell.

FIG. 10 is an illustration explaining a problem when receiving the synchronization signal 120 of the macro cell 10A by the listening-synchronization method and performing a time synchronization. FIG. 11 is an illustration showing an example of a situation of interference between the synchronization signal 120 of the macro cell 10A and a synchronization signal included in the wraparound signal 22 of the small cell 20A.

In general, the accuracy of internal clock of the small-cell base station 20 is not good, therefore, in order to keep the accuracy of time synchronization optimally at all times in the listening-synchronization method, it is preferable to periodically receive a downlink signal of the macro cell 10A, detect the synchronization signal 120 and perform a synchronization processing even during operation of a small-cell base station 20. However, in a system to which the eICIC is applied, subframe numbers are synchronized between a macro-cell base station and a small-cell base station. As described above, since the synchronization signal is necessary when the user terminal apparatus performs an initial access to the base station, the transmission cannot be stopped. Therefore, when trying to receive a downlink signal of the macro cell 10A during operation of the small-cell base station 20, for example as shown in FIG. 10 and FIG. 11, there is a fear that the synchronization signal 220 (PSS 221, SSS 222) included in the wraparound signal 22, which is transmitted from the antenna 231 of the small-cell base station 20 and received by the own small base station, and the synchronization signal 120 (PSS 121, SSS 122) of the downlink signal 12 of the macro cell 10A interfere with each other. Since the received signal strength of this wraparound signal 22 is very large, as compared to the received signal strength of the downlink signal 12 of the macro cell 10A which is passed through a building wall 41 and a window 42, etc., when the wraparound signal 22 interferes with the downlink signal 12 of the macro cell 10A, the synchronization signal 120 (PSS 121, SSS 122) included in the downlink signal 12 of the macro cell 10A cannot be detected, and the time synchronization processing becomes difficult.

As one of means for solving the problem of the listening-synchronization method, there is a wraparound-interference prevention technique (for example, refer to Non-Patent Literature 1) in which the transmission of the small-cell base station itself is sopped at the timing of listening synchronization at the small-cell base station. However, in the wraparound interference prevention technique in which a part of transmission is stopped, there is a problem that frequency utilization efficiency decreases, since a part of signal transmission of the base station in operation is stopped. Moreover, in the wraparound interference prevention technique in which a part of transmission is stopped, since it is impossible to stop the transmission of the synchronization signal that is a common signal and it is indispensable to shift the subframe number of the small-cell base station, the flexible frame configuration of the downlink signal cannot be set. Therefore, the small-cell base station 20 of the present embodiment receives the wraparound signal (interference signal) 22 of the transmitted signal of the small-cell base station 20 itself during operation by the antenna 251, removes (cancels) the wraparound signal (interference signal) 22 from the received signal of the downlink macro cell signal including the synchronization signal 120 of the macro cell 10A by signal processing, detects the synchronization signal 120 of the macro cell 10A, and performs a listening-synchronization processing.

For example, in one example of the present embodiment, the small-cell base station 20 receives a downlink signal that includes the downlink macro cell signal including the synchronization signal 120 transmitted from the macro-cell base station 10 and the downlink wraparound signal 22 transmitted from the small-cell base station 20. Furthermore, the small-cell base station 20 removes an interference of the wraparound signal 22 from the received signal of the downlink signal, with respect to the predetermined subframe in which the downlink wraparound signal 22 from the small-cell base station 20 becomes an interference to the synchronization signal 120 of the macro-cell base station 10, among subframes of the downlink macro cell signal including the synchronization signal 120 of the macro-cell base station 10. Moreover, the small-cell base station 20 performs a time synchronization processing with the macro-cell base station 10 by detecting a timing of the synchronization signal 120 of the macro-cell base station 10 based on the received signal of the downlink signal from which the interference of the wraparound signal 22 is removed. As described above, the small-cell base station 20 performs listening synchronization processing by detecting the synchronization signal 120 of the macro cell 10A from the received signal of the downlink signal from which the wraparound signal 22 of the own base station is removed, therefore, the small-cell base station 20 can perform the time synchronization with the macro-cell base station 10 accurately even during operation of the small-cell base station 20, without stopping the downlink signal transmission of own base station.

In another example of the present embodiment, the small-cell base station 20 receives a downlink signal including a synchronization signal transmitted from the macro-cell base station 10, by controlling to stop the signal transmission of the downlink signal, with respect to the predetermined subframe in which the wraparound signal 22 of downlink from the small-cell base station 20 becomes an interference to the synchronization signal 120 of the macro-cell base station 10, among subframes of the downlink signal including the synchronization signal 120 of the macro-cell base station 10. Furthermore, the small-cell base station 20 receives a residual transmitting signal corresponding to the transmitter noise transmitted even in a timing of stopping the downlink signal transmission of the small-cell base station 20 by directly receiving the residual transmitting signal using a wired communication link, acquires a complex baseband signal by converting from the received residual transmitting signal, removes an interference of the residual transmitting signal from the received signal of the downlink signal with respect to the predetermined subframe based on the acquired complex baseband signal, and performs a time synchronization processing with the macro-cell base station 10 by detecting a timing of the synchronization signal 120 of the macro-cell base station 10 based on the downlink received signal from which the interference of the residual transmitting signal is removed. As described above, the small-cell base station 20 performs a time synchronization with the macro-cell base station 10 by not only avoiding an interference of the own wraparound signal 22 but also detecting by detecting the synchronization signal 120 of the macro-cell base station 10 from the downlink received signal from which the interference of the own transmitter noise is removed, therefore, the small-cell base station 20 can perform the time synchronization with the macro-cell base station 10 accurately even during operation of the small-cell base station 20.

Hereinafter, configuration examples of the small-cell base station 20 having a highly accurate listening-synchronization processing function according to the present embodiments will be described. It is noted that, in the following configuration examples, as the small-cell base station 20 has a standard configuration and operation processing function conforming to the standard specifications of LTE/LTE-Advanced, explanation thereof will be omitted.

Configuration Example 1

Figure 12:
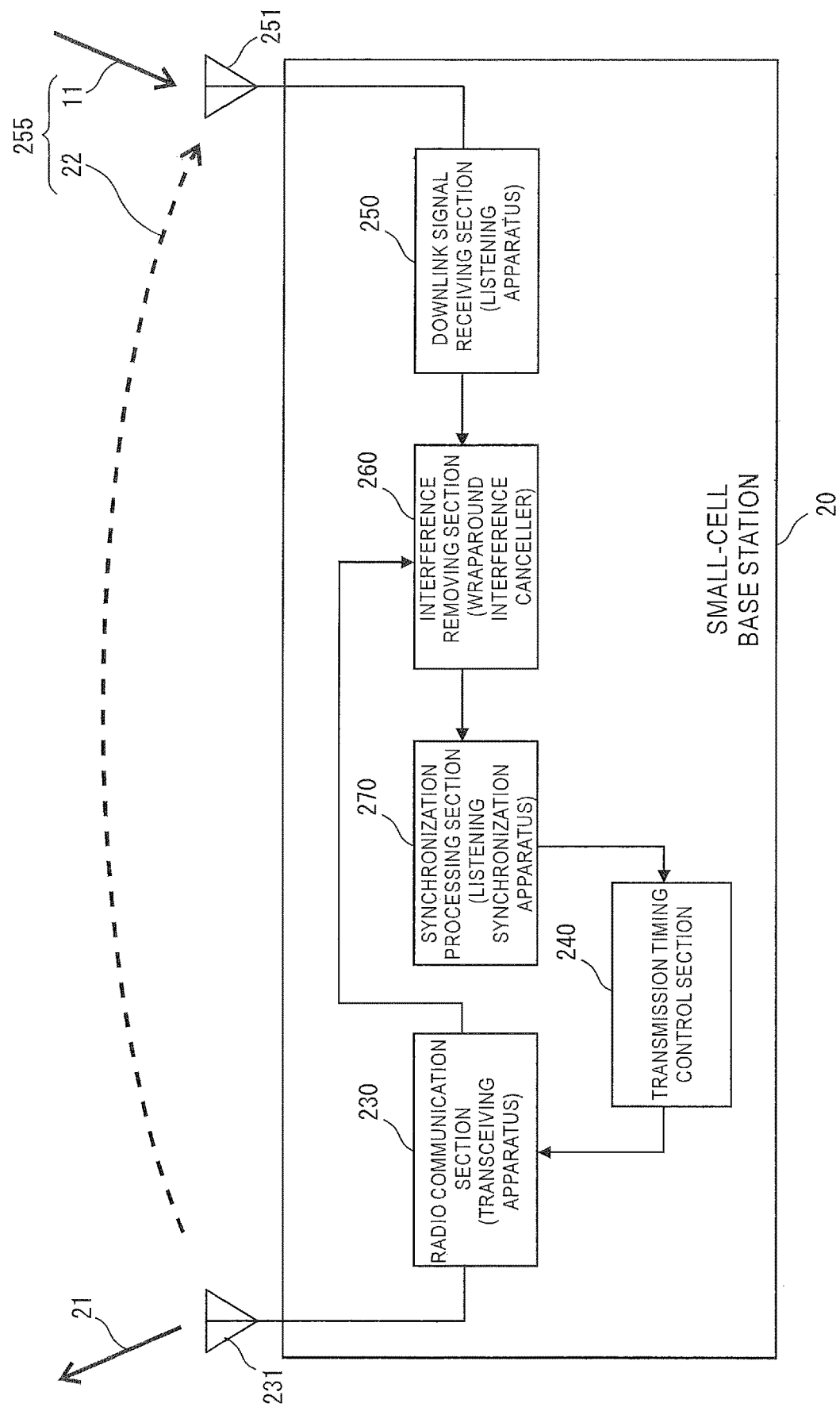
FIG. 12 is a block diagram showing one configuration example of a schematic configuration of a main part in a small-cell base station with a highly accurate listening-synchronization processing function according to the present embodiment.
Figure 13:
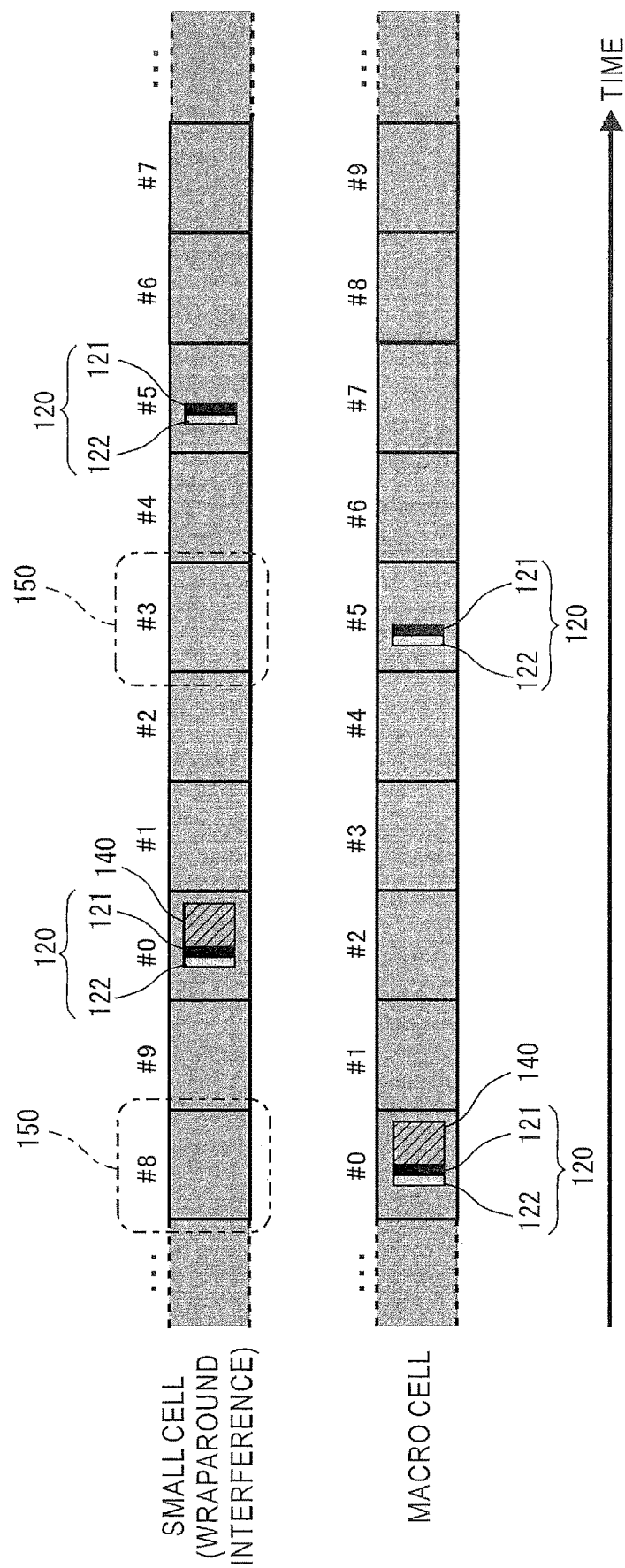
FIG. 13 is an illustration showing one example of a frame configuration of a downlink signal in each of a macro cell and a small cell in the configuration example of FIG. 12.

FIG. 12 is a block diagram showing one configuration example of schematic configuration of a main part in the small-cell base station 20 with a highly accurate listening-synchronization processing function according to the present embodiment. FIG. 13 is an illustration showing one example of a frame configuration of the downlink signal 11 and 21 in each of the macro cell 10A and the small cell 20A in the present configuration example.

In FIG. 12, the small-cell base station 20 of the present configuration example is provided with a radio communication section (LTE transceiving apparatus) 230, a transmission timing control section 240, a downlink signal receiving section (listening apparatus) 250, an interference removing section (wraparound interference canceller) 260, and a synchronization processing section (listening synchronization apparatus) 270.

The radio communication section 230 performs downlink and uplink radio communication with the user terminal apparatus (mobile apparatus, mobile station) 31 located in the small cell 20A via the mobile communication network, by the radio communication system conforming to the standard specification of LTE/LTE-Advanced via the antenna 231. For example, the radio communication section 230 is capable of transmitting a downlink signal 21 of OFDM (Orthogonal Frequency Division Multiplexing) system to the user terminal apparatus 31 located in the small cell 20A.

The transmission timing control section 240 controls a transmission timing of the downlink signal 21 for the user terminal apparatus 31 based on, for example, the predetermined ABS pattern described above, in a state that a time synchronization is performed with the macro-cell base station 10.

The downlink signal receiving section 250 receives the downlink signal 255 that includes the downlink signal (macro cell signal) 11 including the synchronization signal 120 (PSS 121, SSS 122) transmitted from the macro-cell base station 10 and the downlink wraparound signal 22 transmitted from the small-cell base station 20 itself.

The interference removing section 260 removes an interference of the wraparound signal 22 from the received signal of the downlink signal 255, with respect to the predetermined subframe 150 in which the downlink wraparound signal 22 from the small-cell base station 20 interferes with the synchronization signal 120 of the macro-cell base station 10, among subframes of the downlink macro cell signal including the synchronization signal 120 (PSS 121, SSS 122) of the macro-cell base station 10. In the example of FIG. 13, the interference removing section 260 performs a process of removing the interference of the wraparound signal 22 from the received signal of the downlink signal 255, with respect to the subframes (#8, #3) of the small-cell base station 20 corresponding on the time axis to the subframe (#0, #5) in which the synchronization signal 120 in the downlink signal 11 of the macro cell is disposed.

The synchronization processing section (listening synchronization apparatus) 270 detects the timing of the synchronization signal 120 (PSS 121, SSS 122) of the macro-cell base station 10 and performs a time synchronization processing with the macro-cell base station 10, based on the received signal of the downlink signal from which the interference of the wraparound signal 22 is removed.

According to the small-cell base station 20 of the present configuration example, by using the received signal of the downlink signal from which the interference of the wraparound signal 22 is removed, since the timing of the synchronization signal 120 of the macro-cell base station 10 can be accurately detected without being affected by the interference of the wraparound signal 22, it is capable of enhancing the accuracy of time synchronizing with the macro-cell base station 10. Moreover, since there is no necessary to stop the transmission of the downlink signal from the small-cell base station 20, the small-cell base station 20 is capable of performing the time synchronization with the macro-cell base station 10 even during operation.

Configuration Example 2

Figure 14:
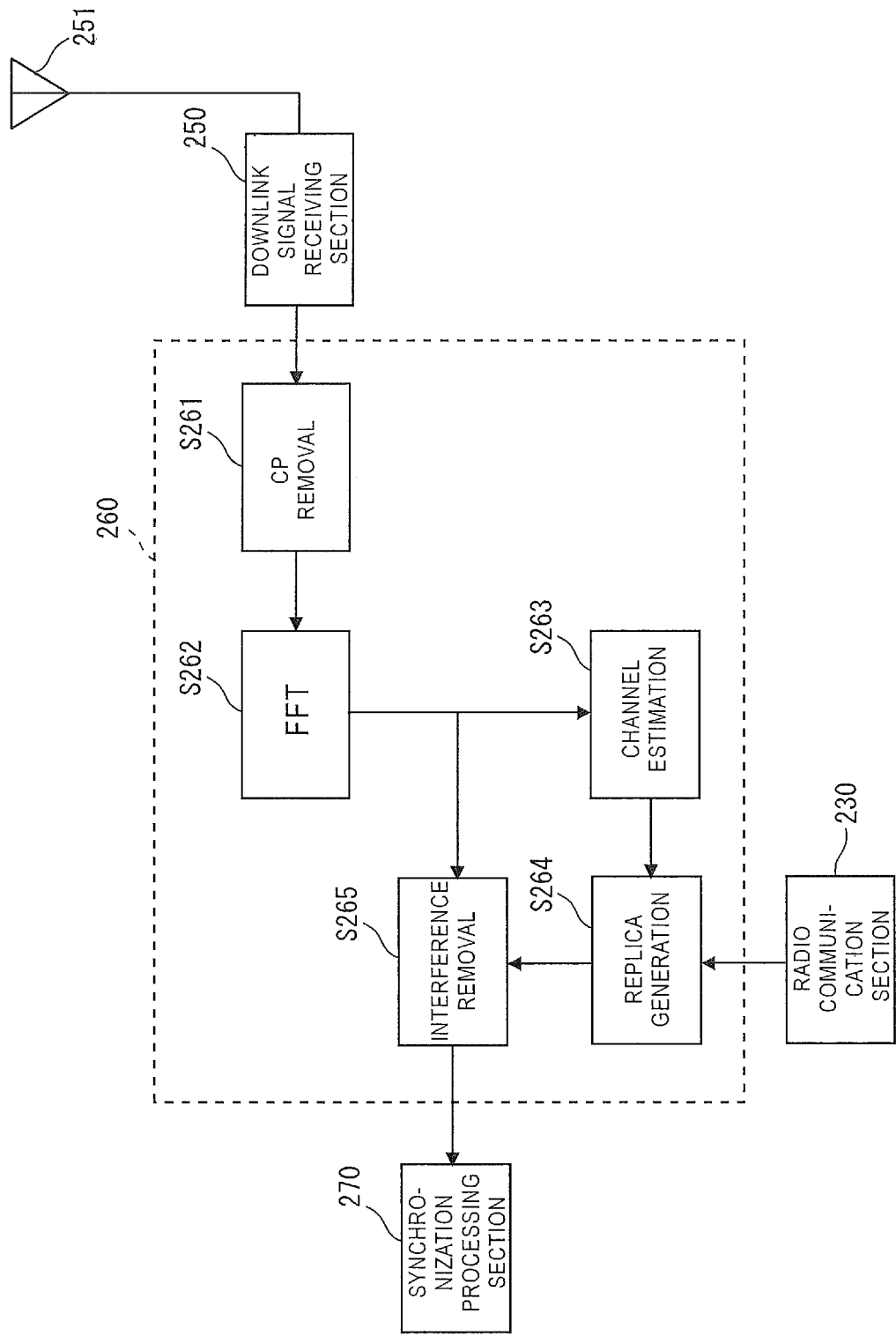
FIG. 14 is a block diagram showing one example of an interference cancel processing in an interference removing section that is provided in a small-cell base station with a listening-synchronization processing function according to the present embodiment.

FIG. 14 is a block diagram showing one example of interference cancel processing in the interference removing section 260 that is provided in the small-cell base station 20 with a listening-synchronization processing function according to the present embodiment. It is noted that the overall configuration of the small-cell base station 20 of the present configuration example is the same as that of FIG. 12 described above, and the description thereof will be omitted.

The interference removing section 260 of the present configuration example shown in FIG. 14 first removes a CP (cyclic prefix) from the received signal on the time axis of the downlink signal 255 received by the downlink signal receiving section 250 in accordance with the timing of downlink signal transmission from the small-cell base station 20 itself (S261). Then, the interference removing section 260 Fourier-transforms the received signal on the time axis from which the CP is removed, by a FFT (Fast Fourier Transform), and converts it into a received signal on the frequency axis (S262), and performs a channel estimation regarding the wraparound signal based on the received signal on the frequency axis (S263). Next, the interference removing section 260 generates a replica of the wraparound signal 22 on the frequency axis by multiplying the downlink signal as a known signal transmitting from the radio communication section 230 in the same small-cell base station 20 by a channel estimated value that is a result of the channel estimation (S264). Next, the interference removing section 260 generates a received signal on the frequency axis from which the interference of the wraparound signal is removed, by subtracting the replica on the frequency axis of the wraparound signal from the received signal on the frequency axis (S265).

The synchronization processing section 270 of the present configuration example obtains a frequency response by multiplying the received signal on the frequency axis, from which the interference of the wraparound signal is removed, outputted from the interference removing section 260 by a complex conjugate of the synchronization signal of the macro-cell base station 10, obtains an impulse response by inverse-Fourier-transforming the frequency response, and detects a timing of the synchronization signal 120 of the macro-cell base station 10 based on the impulse response.

According to the small-cell base station 20 of the present configuration example, by using the received signal of the downlink signal from which the interference of the wraparound signal 22 is removed, since the timing of the synchronization signal 120 of the macro-cell base station 10 can be accurately detected without being affected by the interference of the wraparound signal 22, it is capable of enhancing the accuracy of time synchronizing with the macro-cell base station 10. Moreover, since there is no necessary to stop the transmission of the downlink signal from the small-cell base station 20, the small-cell base station 20 is capable of performing the time synchronization with the macro-cell base station 10 even during operation.

Especially, according to the small-cell base station 20 of the present configuration example, it is capable of increasing the speed of listening-synchronization processing by performing the interference removal processing of the wraparound signal 22 and the timing detecting processing of the synchronization signal 120 on the frequency axis.

Configuration Example 3

Figure 15:
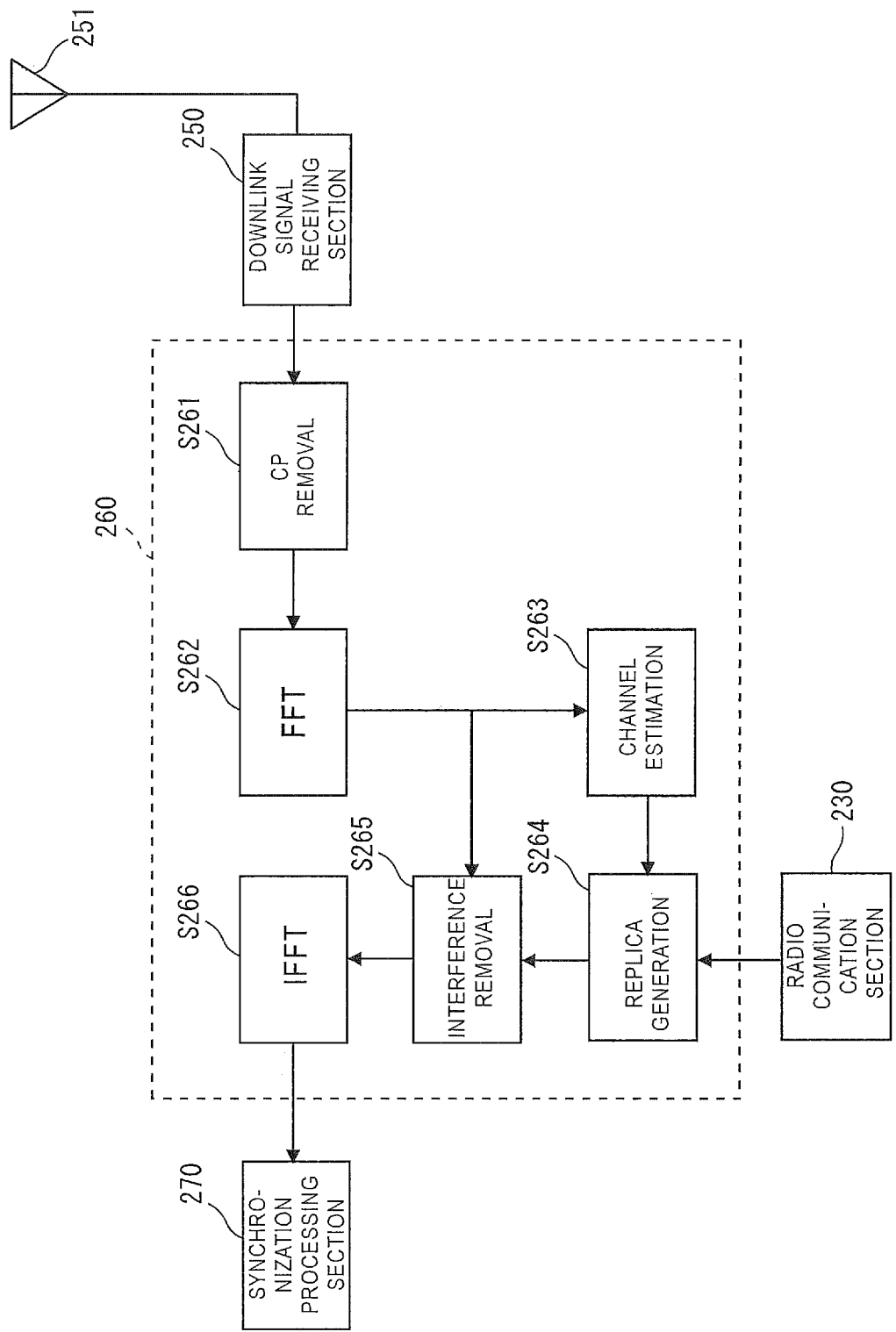
FIG. 15 is a block diagram showing another example of an interference cancel processing in an interference removing section that is provided in a small-cell base station with a listening-synchronization processing function according to the present embodiment.

FIG. 15 is a block diagram showing another example of interference cancel processing in an interference removing section 260 that is provided in a small-cell base station 20 with a listening-synchronization processing function according to the present embodiment. It is noted that the overall configuration of the small-cell base station 20 of the present configuration example is the same as that of FIG. 12 described above, and the description thereof will be omitted. Moreover, the processing steps (S261 to S265) in common with the interference cancel processing in FIG. 14 will be also omitted.

The interference removing section 260 of the present configuration example shown in FIG. 15, after generating the receiving signal on the frequency axis from which the interference of the wraparound signal is removed (S265), inverse-Fourier-transforms the received signal on the frequency axis by an IFFT (Inverse Fast Fourier Transform) and converts it into a received signal on the time axis (S266).

The synchronization processing section 270 of the present configuration example obtains a cross correlation value by multiplying the received signal on the time axis, from which the interference of the wraparound signal is removed, outputted from the interference removing section 260 by a complex conjugate of the synchronization signal of the macro-cell base station 10, and detects a timing of the synchronization signal 120 of the macro-cell base station 10 based on the cross correlation value.

According to the small-cell base station 20 of the present configuration example, by using the received signal of the downlink signal from which the interference of the wraparound signal 22 is removed, since the timing of the synchronization signal 120 of the macro-cell base station 10 can be accurately detected without being affected by the interference of the wraparound signal 22, it is capable of enhancing the accuracy of time synchronizing with the macro-cell base station 10. Moreover, since there is no necessary to stop the transmission of the downlink signal from the small-cell base station 20, the small-cell base station 20 is capable of performing the time synchronization with the macro-cell base station 10 even during operation.

Configuration Example 4

Figure 16:
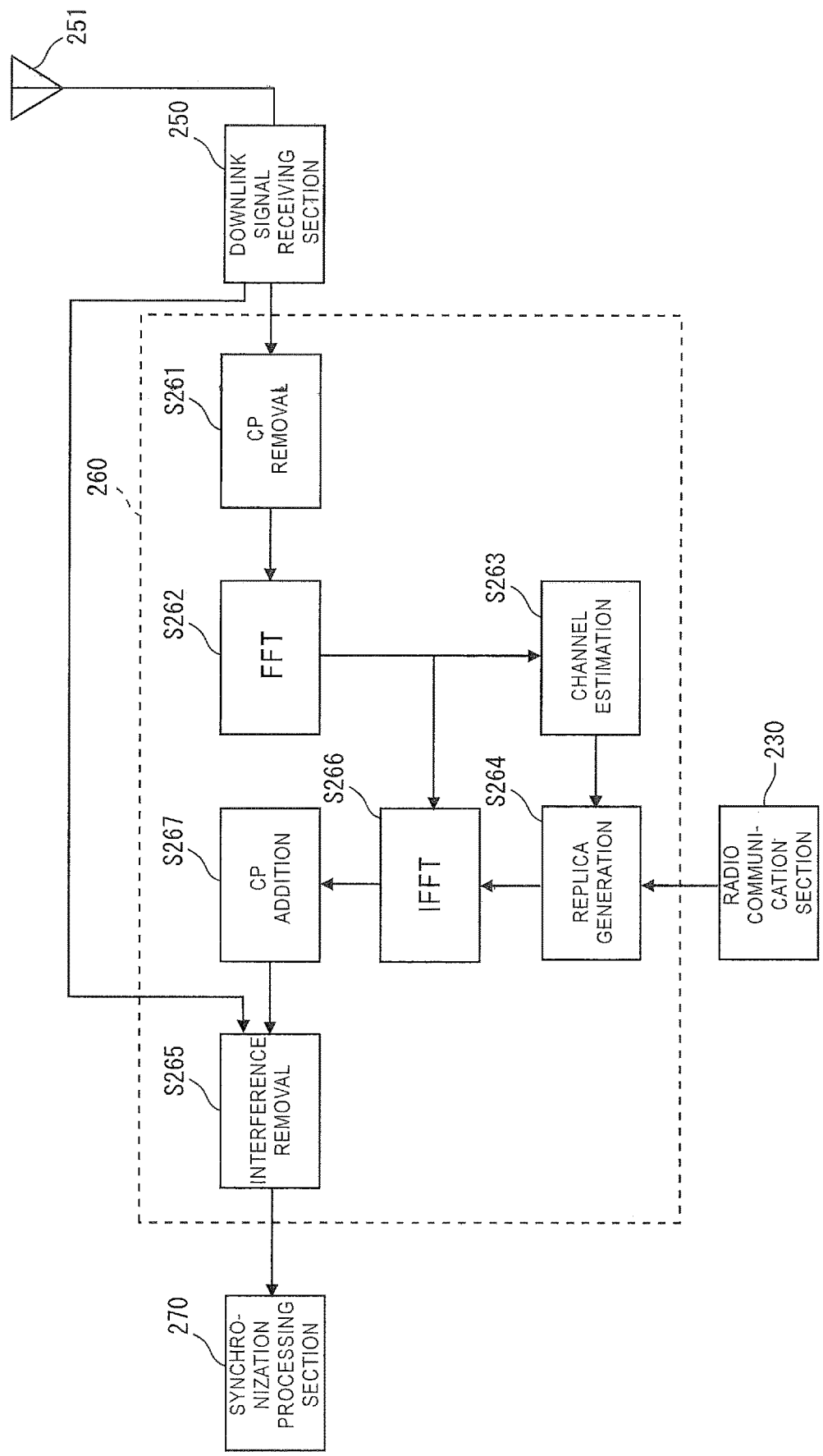
FIG. 16 is a block diagram showing yet another example of interference cancel processing in an interference removing section that is provided in a small-cell base station with a listening-synchronization processing function according to the present embodiment.

FIG. 16 is a block diagram showing still another example of interference cancel processing in the interference removing section 260 that is provided in the small-cell base station 20 with a listening-synchronization processing function according to the present embodiment. It is noted that the overall configuration of the small-cell base station 20 of the present configuration example is the same as that of FIG. 12 described above, and the description thereof will be omitted. Moreover, the processing steps (S261 to S264) in common with the interference cancel processing in FIG. 14 will be also omitted.

The interference removing section 260 of the present configuration example shown in FIG. 16, after generating the replica on the frequency axis (S264), inverse-Fourier-transforms the generated replica on the frequency axis by an IFFT (Inverse Fast Fourier Transform) and converts it into a replica on the time axis (S266). Then, the interference removing section 260 adds a CP (cyclic prefix) to the replica on the time axis as well as the standard LTE (S267). Next, the interference removing section 260 generates a received signal on the time axis from which the interference of the wraparound signal is removed, by subtracting the replica on the time axis of the wraparound signal, to which the CP is added, from the received signal on the time axis with a CP which is inputted from the downlink signal receiving section 250 (S265).

The synchronization processing section 270 of the present configuration example obtains a cross correlation value by multiplying the received signal on the time axis, from which the interference of the wraparound signal is removed, outputted from the interference removing section 260 by a complex conjugate of the synchronization signal of the macro-cell base station 10, and detects a timing of the synchronization signal 120 of the macro-cell base station 10 based on the cross correlation value.

According to the small-cell base station 20 of the present configuration example, by using the received signal of the downlink signal from which the interference of the wraparound signal 22 is removed, since the timing of the synchronization signal 120 of the macro-cell base station 10 can be accurately detected without being affected by the interference of the wraparound signal 22, it is capable of enhancing the accuracy of time synchronizing with the macro-cell base station 10. Moreover, since there is no necessary to stop the transmission of the downlink signal from the small-cell base station 20, the small-cell base station 20 is capable of time synchronization with the macro-cell base station 10 even during operation.

It is noted that, in the small-cell base stations 20 of the configuration examples 2 to 4, in case of using the MIMO transmission system for the transmission of the downlink data signal, the foregoing channel estimation may be performed for each of the plural transmission paths of the wraparound signal 22 transmitting from each of the plural antennas, by using the aforementioned cell reference signal (CRS) unique to each cell and the synchronization signal (PSS, SSS) (S263).

Figure 17:
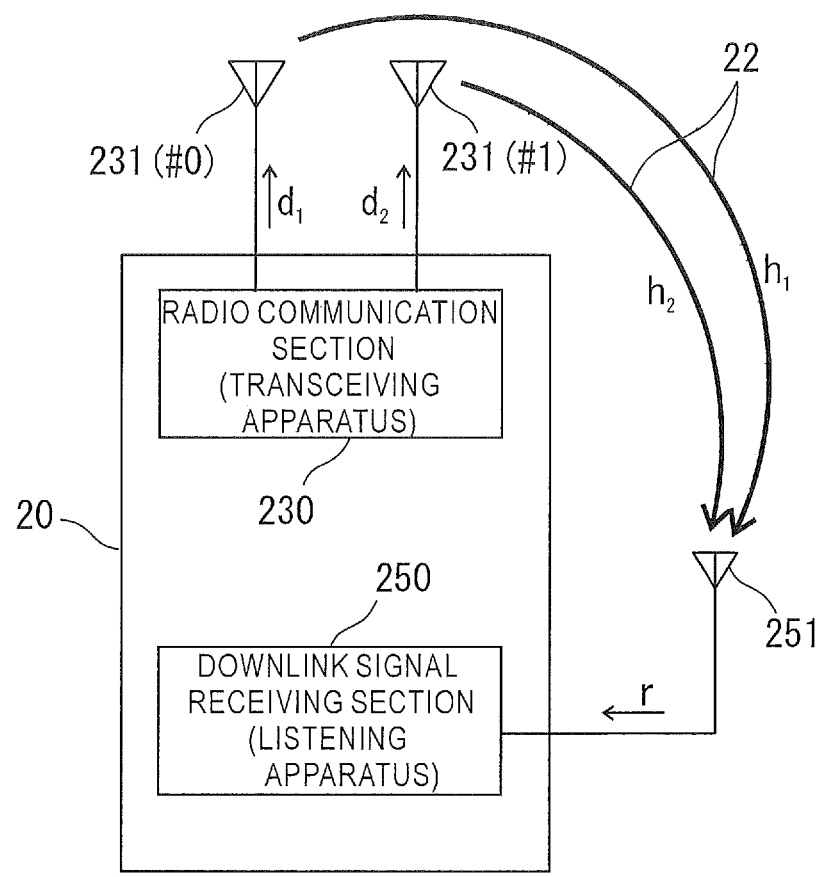
FIG. 17 is an illustration showing downlink signals ($d_1$, $d_2$) transmitted from each of two antennas and transmission paths ($h_1$, $h_2$) of the wraparound interference when performing a channel estimation using a cell reference signal in a small cell base station adopting an MIMO transmission system according to the present embodiment.

FIG. 17 is an illustration showing downlink signals ($d_1$, $d_2$) transmitted from each of the two antennas 231 (#0, #1) and transmission paths ($h_1$, $h_2$) of the wraparound interference when performing a channel estimation using a cell reference signal in the small cell base station 20 adopting an MIMO transmission system according to the present embodiment. Each of FIG. 18A and FIG. 18B is an illustration showing one example of a subframe configuration of downlink signals transmitted from each of the two antennas 231 (#0, #1) in the small cell base station 20.

Figure 18A:
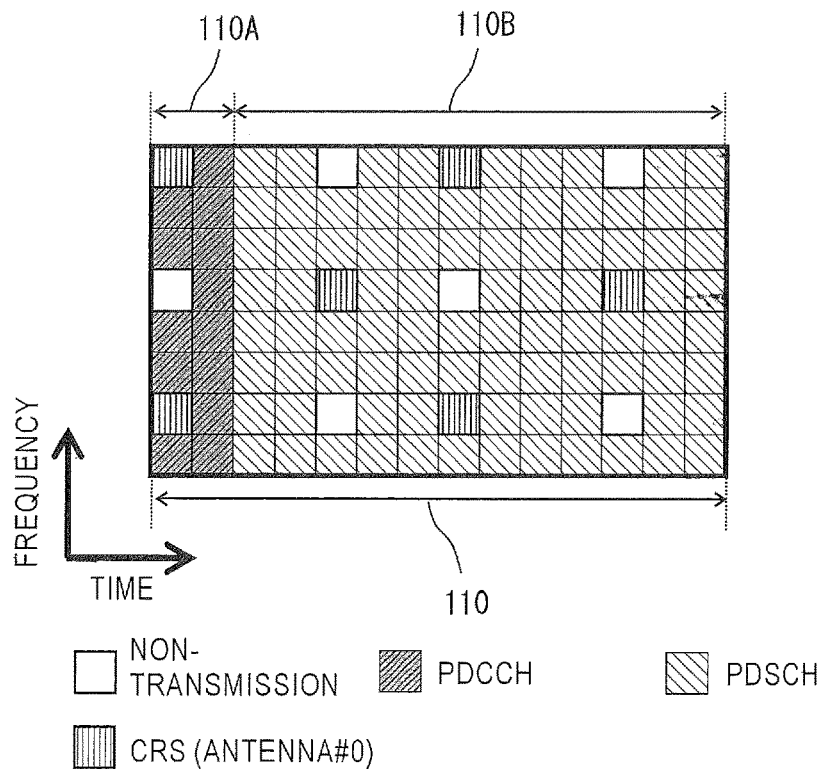
FIG. 18A is an illustration showing one example of a subframe configuration of downlink signals transmitted from each of two antennas in a small cell base station.
Figure 18B:
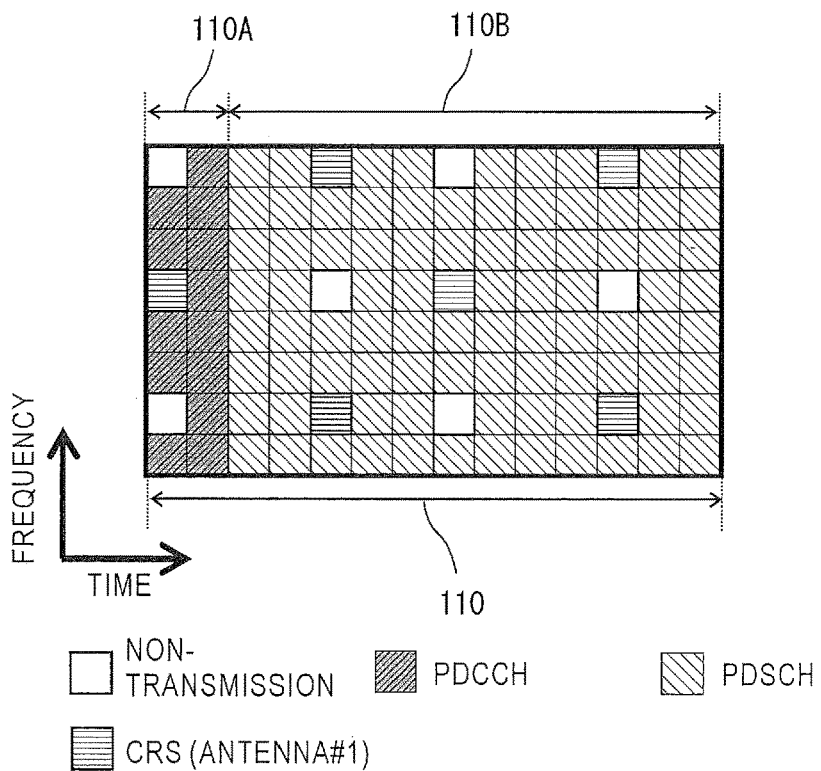
FIG. 18B is an illustration showing one example of a subframe configuration of downlink signals transmitted from each of two antennas in a small cell base station.

In the present example, as shown in FIGS. 18A and 18B, in two downlink signals transmitting from the each of the antennas 231 (#0, #1), a cell reference signal (antenna #0) and a cell reference signal (antenna #1) are respectively allocated to the resource elements at positions different from each other and received by the antenna 251 of the downlink signal receiving section 250. Moreover, the control signal (PDCCH) is not transmitted in the resource element corresponding to the cell reference signal CRS so that the control signal (PDCCH) does not interfere with the cell reference signal CRS between the two downlink signals $d_1$ and $d_2$.

In the present example, as shown in FIG. 13 described above, the channel estimation of the wraparound signal 22 is performed by using the cell reference signals CRS included in the subframes (subframes #8 and #3 in the example of FIG. 13) of the small cell 20A corresponding to the subframes (subframes #0 and #5 in the example of FIG. 13) transmitting the synchronization signal (PSS, SSS) 120 in the macro cell 10A.

In FIG. 17, the downlink signals (data signals) of the small-cell base station 20 are transmitted as separate signals $d_1$ and $d_2$ for each antenna 231 (#0, #1). Each of the signals $d_1$ and $d_2$ goes through each of the transmission paths ($h_1$, $h_2$) different from each other, and is received as a wraparound signal 22 by the antenna 251 of the downlink signal receiving section (listening apparatus) 250. Herein, the wraparound signal $d_1$ transmitting from the first antenna 231 (#0) has a subframe configuration of FIG. 18A, goes through the first transmission path $h_1$ and is received by the antenna 251 of the downlink signal receiving section 250. The wraparound signal $d_2$ transmitting from the second antenna 231 (#1) has a subframe configuration of FIG. 18B, goes through the second transmission path $h_2$ and is received by the antenna 251 of the downlink signal receiving section 250. Therefore, the received signal r of the wraparound signals $d_1$ and $d_2$ received by the antenna 251 is a combined signal as shown in the following expression (1) and is received by the downlink signal receiving section 250 and is inputted to the interference removing section 260.

[Expression 1]

$$r = h_1 d_1 + h_2 d_2 \quad (1)$$

The interference removing section 260 performs a channel estimation with respect to the transmission paths ($h_1$, $h_2$) of the wraparound signal 22, based on the received signal r of the wraparound signal including the cell reference signal CRS without mutual interference between antennas 231 (#0, #1) received by the downlink signal receiving section 250 and the known resource allocation information (refer to FIGS. 18A and 18B) for the cell reference signal CRS that is different for each of the antennas 231 (#0, #1).

As described above, in the example of channel estimation shown in FIG. 17 and FIGS. 18A and 18B, it is possible to accurately perform the channel estimation with respect to the transmission paths ($h_1$, $h_2$) of the wraparound signal 22, even when the frames are not synchronized between the small cell and the macro cell, by performing the channel estimation using the cell reference signal CRS.

Figure 19:
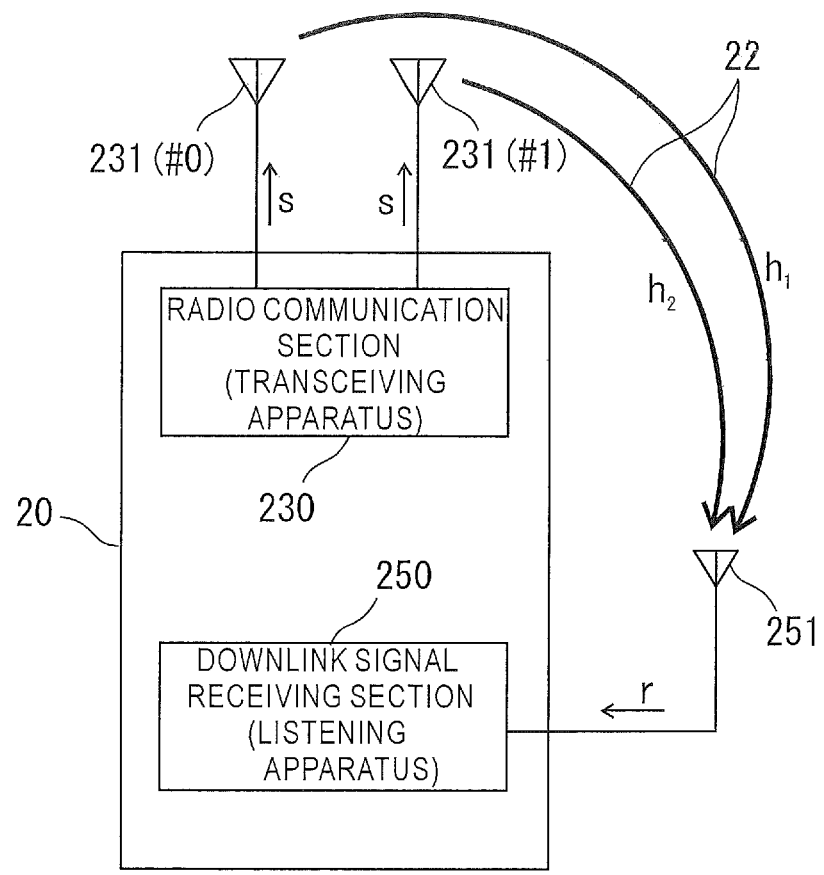
FIG. 19 is an illustration showing same synchronization signals transmitted from each of two antennas and transmission paths ($h_1$, $h_2$) of the wraparound interference when performing a channel estimation using a synchronization signal in a small cell base station adopting an MIMO transmission system according to the present embodiment.
Figure 20:
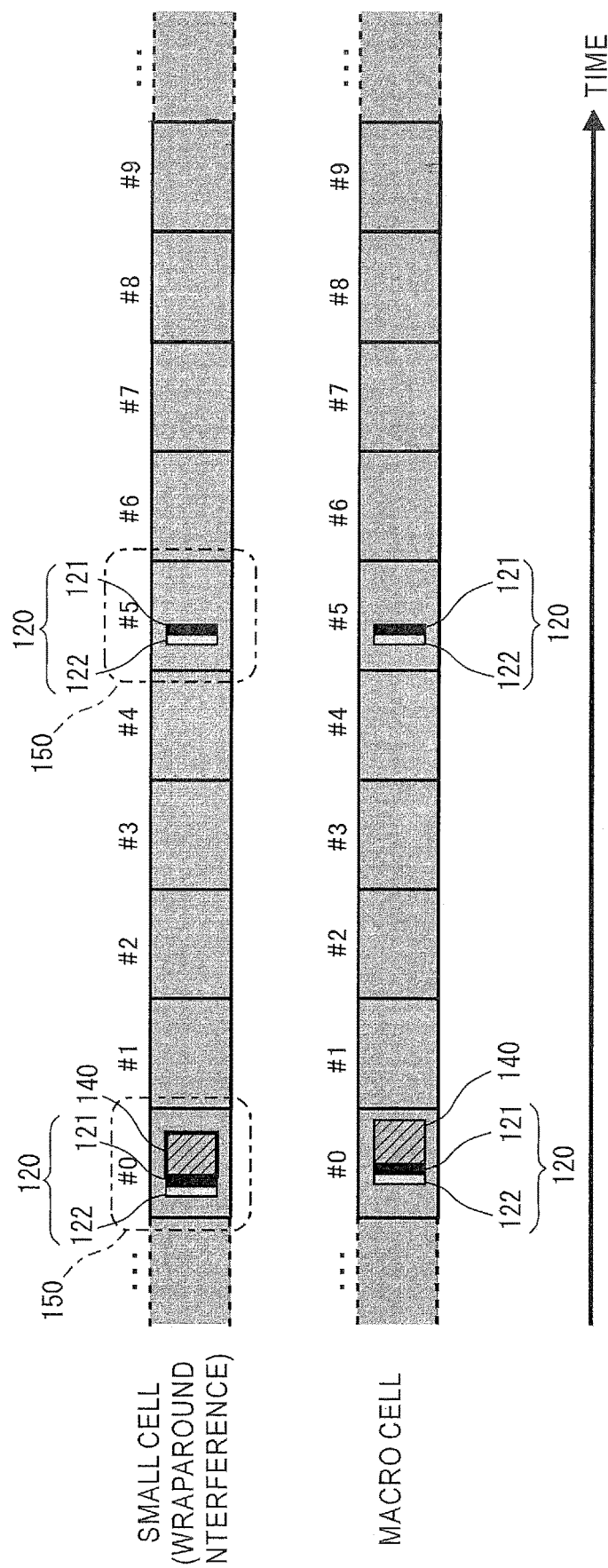
FIG. 20 is an illustration showing one example of a frame configuration of a downlink signal in each of a macro cell and a small cell when performing a channel estimation using a synchronization signal.

FIG. 19 is an illustration showing same synchronization signal transmitted from each of two antennas 231 (#0, #1) and transmission paths ($h_1$, $h_2$) of the wraparound interference when performing a channel estimation using a synchronization signal in a small cell base station 20 adopting a MIMO transmission system according to the present embodiment. FIG. 20 is an illustration showing one example of a frame configuration of a downlink signal in each of the macro cell 10A and the small cell 20A when performing a channel estimation using a synchronization signal. Moreover, FIG. 21 is an illustration showing one example of a frame configuration of a downlink signal including a synchronization signal used for a channel estimation of the small cell 20A.

In the present example, as shown in FIG. 20, the frames are synchronized between the small cell and the macro cell, the channel estimation of the wraparound signal 22 is performed by using the synchronization signals 120 included in the subframe (subframes #0 and #5 in the example of FIG. 20) of the small cell 20A corresponding to the subframe (subframes #0 and #5 in the example of FIG. 20) in which the synchronization signals 120 (PSS 121, SSS 122) transmitted in the macro cell 10A.

Figure 21:
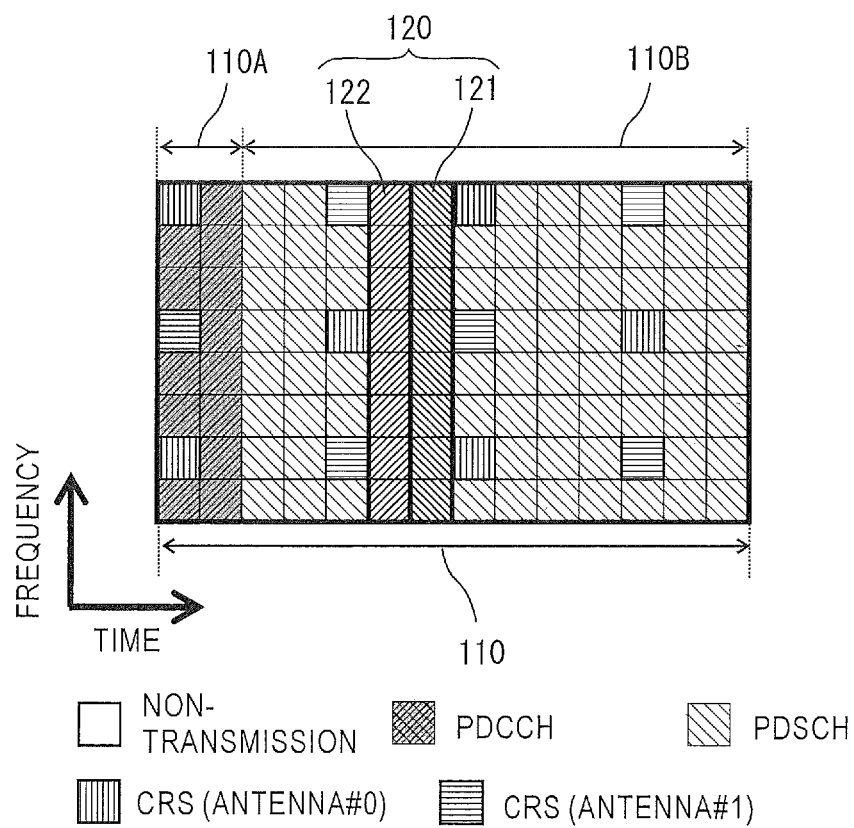
FIG. 21 is an illustration showing one example of a frame configuration of a downlink signal including a synchronization signal used for a channel estimation of a small cell.

In the present example, as shown in FIG. 21, in two downlink signals transmitted from each antennas 231 (#0, #1), the cell reference signal (antenna #0) and the cell reference signal (antenna #1) are allocated to the resource elements at positions different from each other, and received by the antenna 251 of the downlink signal receiving section 250. In the resource element corresponding to the cell reference signal CRS, the control signal (PDCCH) is not transmitted so that the control signal (PDCCH) does not interfere with the cell reference signal CRS between the two downlink signals $d_{1\ and}\ d_2$.

In FIG. 19, in the downlink signal of the small-cell base station 20, the same synchronization signal s (120) is transmitted for each of the two antennas 231 (#0, #1). Each of the synchronization signals s (120) transmitted from each of the antennas goes through each of the transmission paths ($h_1$, $h_2$) different from each other, and is received as the wraparound signal 22 by the antenna 251 of the downlink signal receiving section (listening apparatus) 250. Herein, the synchronization signal s (120) transmitted from the first antenna 231 (#0) goes through the first transmission path $h_1$ and is received by the antenna 251 of the downlink signal receiving section 250. The synchronization signal (wraparound signal) s transmitting from the second antenna 231 (#1) goes through the second transmission path $h_2$ and is received by the antenna 251 of the downlink signal receiving section 250. Therefore, the received signal r of the wraparound signal including the synchronization signals s received by the antenna 251 is a combined signal as shown in the following expression (2), and is received by the downlink signal receiving section 250, and is inputted to the interference removing section 260.

[Expression 2]

$$r = hs = (h_1 + h_2)s \qquad (2)$$

The interference removing section 260 performs a channel estimation with respect to the transmission path h combined with the transmission paths ($h_1$, $h_2$) of the wraparound signal 22, based on the received signal r of the wraparound signal including the synchronization signal 120 received by the downlink signal receiving section 250 and the known resource allocation information (refer to FIG. 21) of the synchronization signal s.

As described above, in the example of channel estimation shown in FIG. 19 to FIG. 21, it is possible to perform a simple channel estimation with respect to the transmission paths ($h_1$, $h_2$) of the wraparound signal 22, without being affected by the number of antennas of the small-cell base station 20, by performing the channel estimation using the synchronization signal 120.

It is noted that, in the channel estimation of the interference removing section 260 in FIG. 17 and FIGS. 18A and 18B, in case of performing the channel estimation using the cell reference signal CRS in the only subframe in which the synchronization signal (PSS, SSS) of the macro cell 10A is interfered, among the subframes (#0 to #9) of the small cell 20A, there is a fear that the accuracy of channel estimation is deteriorated when the downlink signal of the macro cell 10A is strong.

Therefore, the interference removing section 260 in the present embodiment may perform a channel estimation based on the cell reference signal CRS included in the subframe in which the macro-cell base station 10 does not transmit, among the subframes (#0 to #9) of the small cell 20A.

Figure 22:
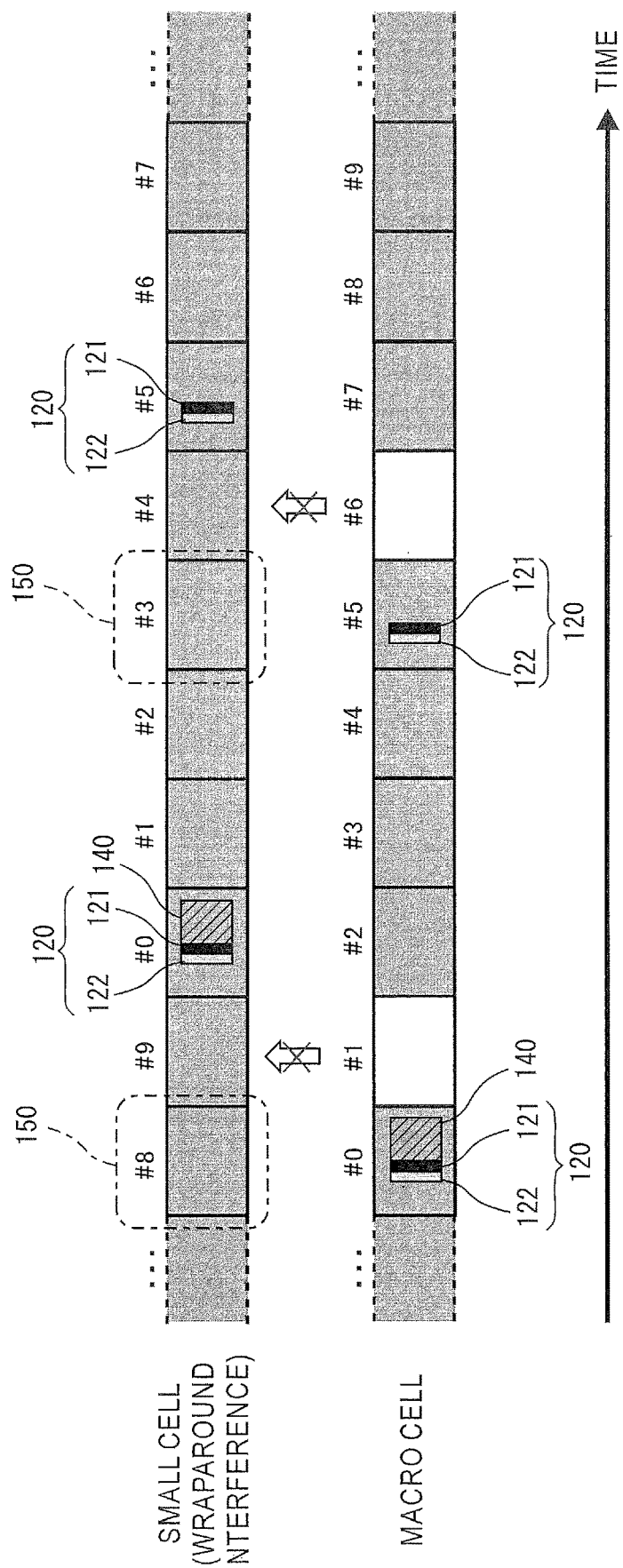
FIG. 22 is an illustration showing another example of a frame configuration of a downlink signal in each of a macro cell and a small cell in a channel estimation using a cell reference signal of a small cell.

For example, as shown in FIG. 22, transmission in a part of the subframes (subframes #1 and #6 in the illustrated example) of the macro cell 10A is stopped by the ABS, and a channel estimation is performed based on the cell reference signal CRS included in the subframes (subframes #9 and #4 in the illustrated example) of the small cell 20A, which corresponds to the subframe in which the transmission of the macro cell 10A is stopped. Then, based on this channel estimation, the channel estimation of the subframe 150 in which the interference (interference of the wraparound signal 22 of the small cell 20A) to the synchronization signal (PSS, SSS) of the macro cell 10A is obtained by complementing.

As described above, by using the result of channel estimation performed on the basis of the cell reference signal CRS included in the subframe in which the macro-cell base station 10 does not transmit, it is less subject to the downlink signal of the macro cell 10A, the accuracy of channel estimation of the target subframe 150 for removing the interference (interference of the wraparound signal 22 of the small cell 20A) to the synchronization signal (PSS, SSS) of the macro cell 10A is improved, and the characteristics of the wraparound interference canceller is improved.

In the channel estimation of the interference removing section 260 in FIG. 19 to FIG. 21, in case of performing the channel estimation using the synchronization signal 120 in the only subframe in which the synchronization signal (PSS, SSS) of the macro cell 10A is interfered, among the subframes (#0 to #9) of the small cell 20A, there is a fear that the accuracy of channel estimation is deteriorated when the downlink signal of the macro cell 10A is strong.

Therefore, the interference removing section 260 in the present embodiment may perform a channel estimation based on the synchronization signal 120 included in the subframe in which the macro-cell base station 10 does not transmit, among the subframes (#0 to #9) of the small cell 20A.

Figure 23:
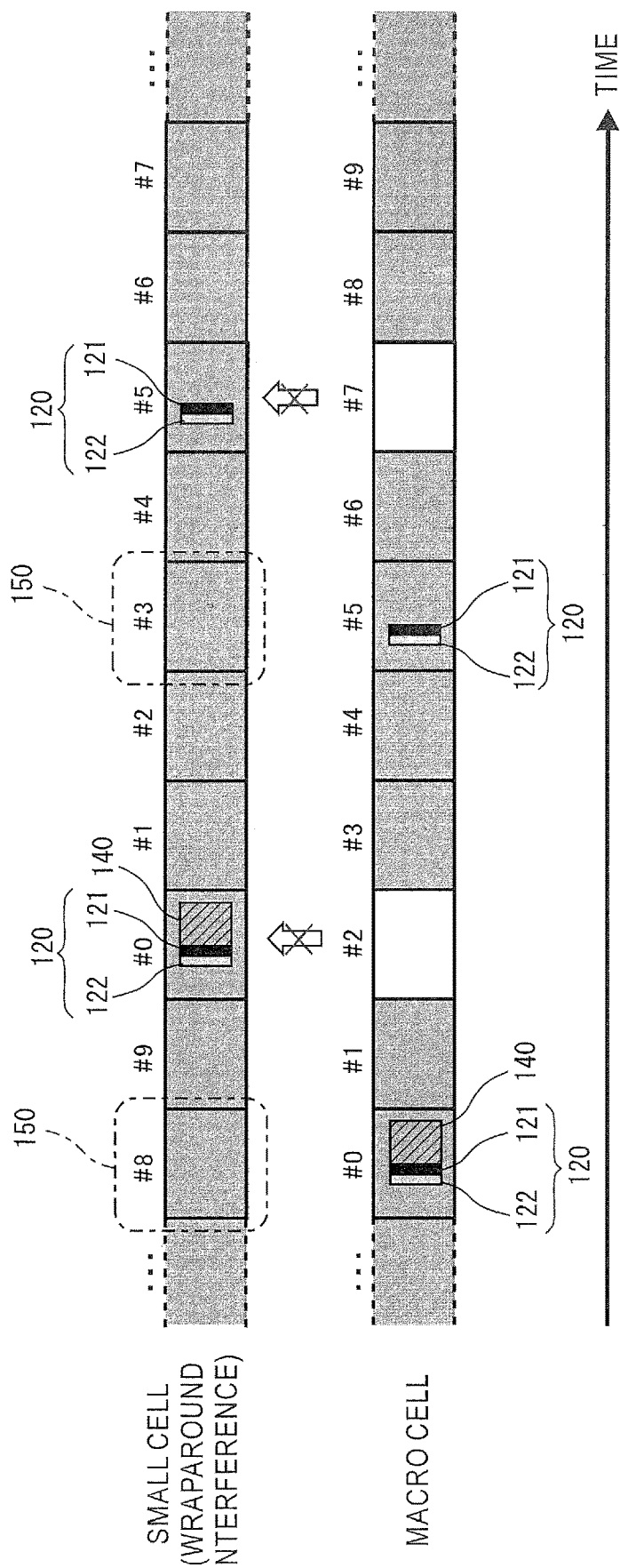
FIG. 23 is an illustration showing another example of a frame configuration of a downlink signal in each of a macro cell and a small cell in a channel estimation using a synchronization signal of a small cell.

For example, as shown in FIG. 23, transmission in a part of the subframe (subframes #2 and #7 in the illustrated example) of the macro cell 10A is stopped by the ABS, and a channel estimation is performed based on the synchronization signal 120 included in the subframes (subframes #0 and #5 in the illustrated example) including the synchronization signal 120 of the small cell 20A, which corresponds to the subframe in which the transmission of the macro cell 10A is stopped. Then, based on this channel estimation, the channel estimation of the subframe 150 in which the interference (interference of the wraparound signal 22 of the small cell 20A) to the synchronization signal (PSS, SSS) of the macro cell 10A is obtained by complementing.

As described above, by using the result of channel estimation performed on the basis of the synchronization signal 120 included in the subframe in which the macro-cell base station 10 does not transmit, it is less subject to the downlink signal of the macro cell 10A, the accuracy of channel estimation of the target subframe 150 for removing the interference of the wraparound signal 22 is improved, and the characteristics of the wraparound interference canceller is improved.

Figure 24A:
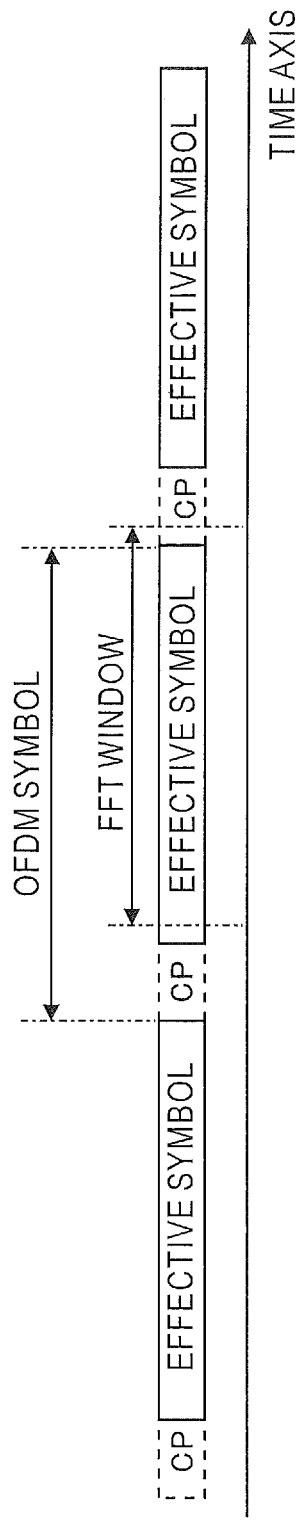
FIG. 24A is an illustration showing an interference between symbols due to a timing shift of a time window for Fourier transformation.

In the FFT (S262) of the interference removing section 260 in FIG. 17 to FIG. 21, when the timing of time window for Fourier transform (FFT window) is shifted, there is a fear that an interference with a preceding or succeeding symbol occurs and the accuracy of channel estimation of the wraparound signal 22 is deteriorated. For example, as shown in FIG. 24A, when the time window for Fourier transform (FFT window) is shifted backwards, since a Fourier transform is performed by including a part of CP of the next OFDM symbol (behind on the time axis), there is a fear that the accuracy of effective symbol on the frequency axis is lowered and the accuracy of channel estimation of the wraparound signal 22 is deteriorated.

Figure 24B:
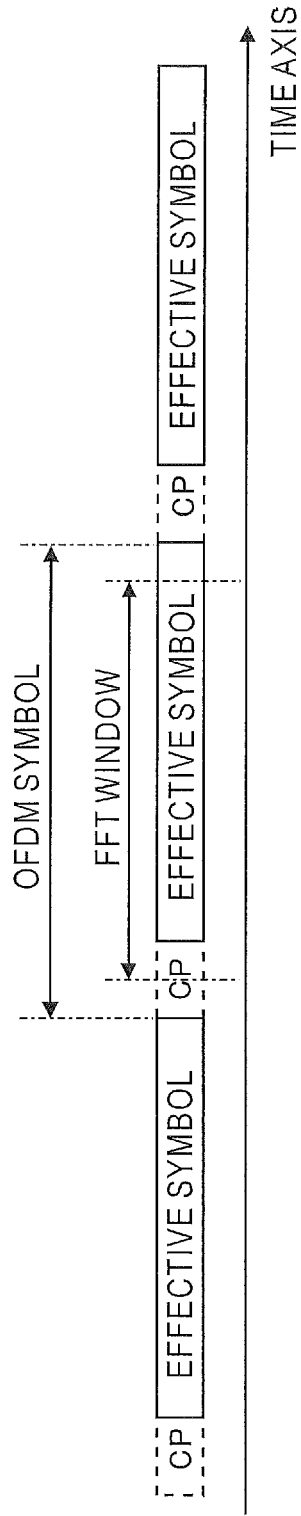
FIG. 24B is an illustration showing a setting example of a timing of a time window for Fourier transformation in an interference removing section of a small-cell base station according to the present embodiment.

Therefore, as shown in FIG. 24B, the startup timing of time window for Fourier transform (FFT window) may be set so that the front end of time window for Fourier transform (FFT window) calculating Fourier transforms in the FFT (S262) of the interference removing section 260 is located in the CP (for example, in the center of the CP) of the effective symbol in OFDM symbols. In this case, since an interference between the time window for Fourier transform and the CP of the next OFDM symbol (behind on the time axis) does not occur even when the position of the time window for Fourier transform varies in some degree, it is capable of suppressing the degradation of channel estimation accuracy of the wraparound signal 22.

Configuration Example 5

Figure 25:
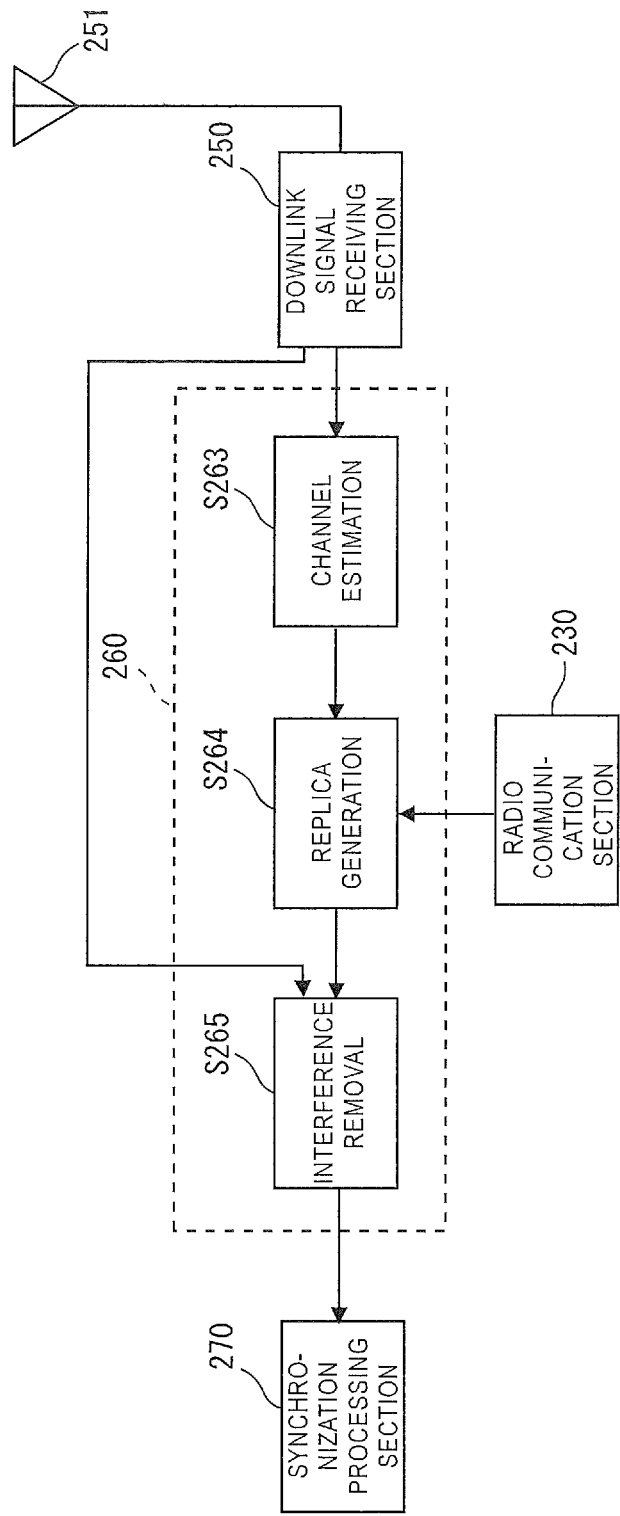
FIG. 25 is a block diagram showing yet another example of an interference cancel processing in an interference removing section that is provided in a small-cell base station with a listening-synchronization processing function according to the present embodiment.

FIG. 25 is a block diagram showing yet another example of an interference cancel processing in the interference removing section 260 that is provided in a small-cell base station 20 with a listening-synchronization processing function according to the present embodiment. The present configuration example is an example in which the interference cancel processing in the interference removing section 260 is completed on the time axis. It is noted that the overall configuration of the small-cell base station 20 of the present configuration example is the same as that in the above-described FIG. 12, the description thereof will be omitted.

The interference removing section 260 of the present configuration example shown in FIG. 25, first, obtains an impulse response by calculating a cross correlation function between the received signal on the time axis of the downlink signal received by the downlink signal receiving section 250 and the downlink signal transmitted from the small-cell base station 20, and performs a channel estimation (S263). Then, the interference removing section 260 generates a replica on the time axis of the wraparound signal 22 by multiplying the downlink signal as a known signal transmitted from the radio communication section 230 in the same small-cell base station 20 by the impulse response value as a result of the channel estimation (S264). Next, the interference removing section 260 generates a received signal on the time axis, from which the interference of the wraparound signal is removed, by subtracting the replica on the time axis of the wraparound signal 22 from the received signal on the time axis outputted from the downlink signal receiving section 250 (S265).

The synchronization processing section 270 of the present configuration example, obtains a cross correlation value by multiplying the received signal on the time axis, from which the interference of the wraparound signal is removed, outputted from the interference removing section 260, by a complex conjugate of the synchronization signal of the macro-cell base station 10, and detects a timing of the synchronization signal 120 of the macro-cell base station 10 based on the cross correlation value.

According to the small-cell base station 20 of the present configuration example, by using the received signal of the downlink signal from which the interference of the wraparound signal 22 is removed, since the timing of the synchronization signal 120 of the macro-cell base station 10 can be accurately detected without being affected by the interference of the wraparound signal 22, it is capable of enhancing the accuracy of time synchronizing with the macro-cell base station 10. Moreover, since there is no necessary to stop the transmission of the downlink signal from the small-cell base station 20, the small-cell base station 20 is capable of performing the time synchronization with the macro-cell base station 10 even during operation.

Configuration Example 6

Figure 26:
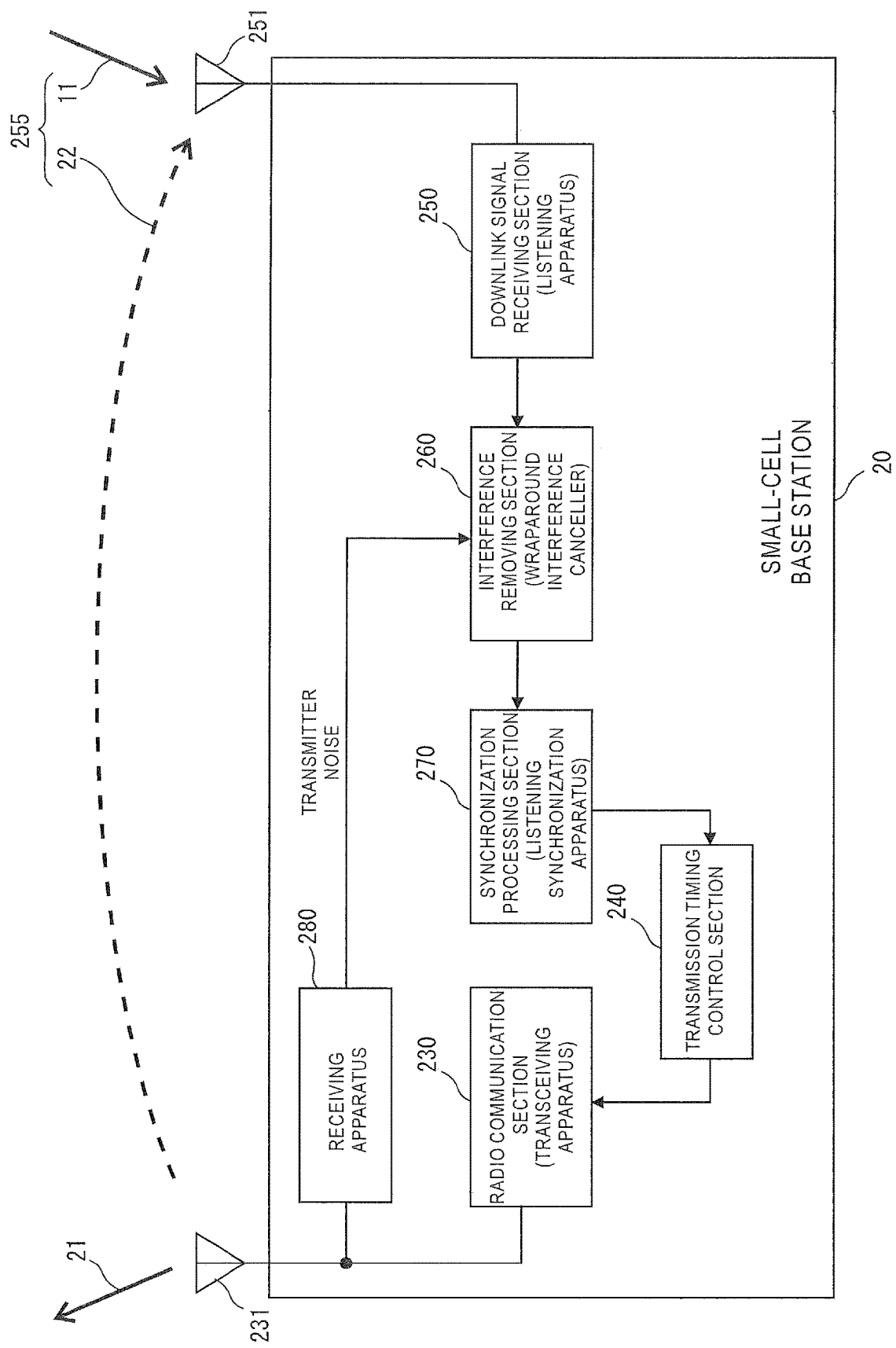
FIG. 26 is a block diagram showing another configuration example of a schematic configuration of a main part in a small-cell base station with a listening-synchronization processing function of high-order accuracy according to the present embodiment.
Figure 27:
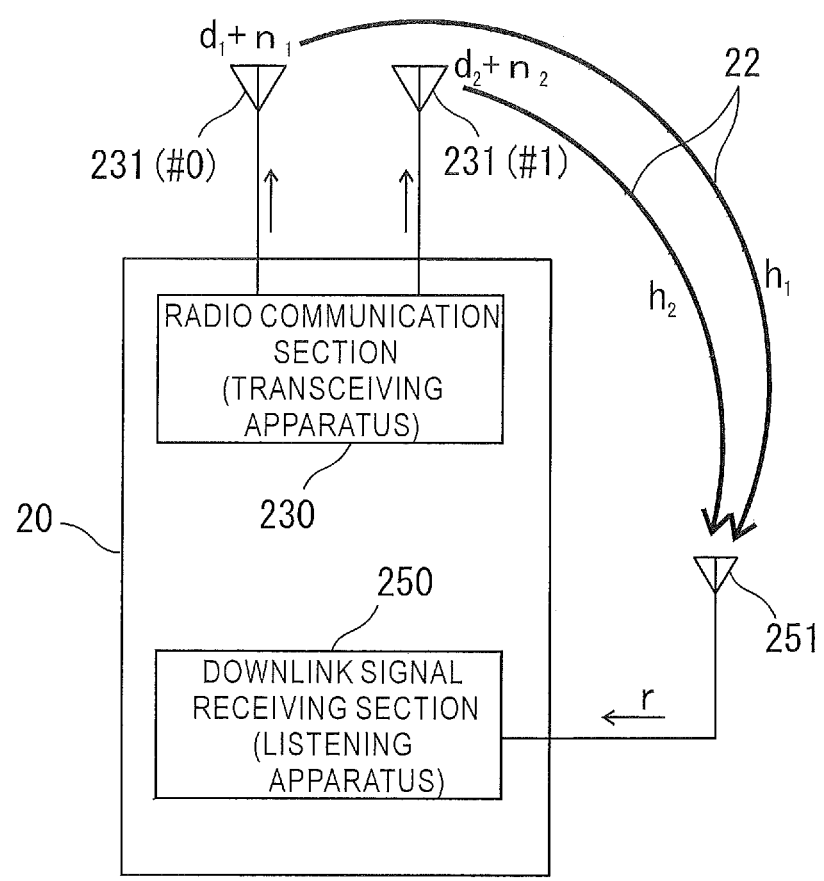
FIG. 27 is an illustration showing downlink signals ($d_1$, $d_2$) including transmitter noises ($n_1$, $n_2$) transmitted from each of two antennas and transmission paths ($h_1$, $h_2$) of the wraparound interference in a small cell base station adopting an MIMO transmission system according to the present embodiment.

FIG. 26 is a block diagram showing yet another configuration example of a schematic configuration of a main part in the small-cell base station 20 with a listening-synchronization processing function of high-order accuracy according to the present embodiment. FIG. 27 is an illustration showing downlink signals ($d_1$, $d_2$) including transmitter noises ($n_1$, $n_2$) transmitted from each of the two antennas and the transmission paths ($h_1$, $h_2$) of the wraparound interference in the small-cell base station 20 adopting an MIMO transmission system. The present configuration example is an example in which the transmitter noise in the radio communication section 230 can be further canceled (removed) so that the time synchronization with the macro-cell base station 10 can be performed more accurately.

In FIG. 27, the downlink signal (data signal) of the small-cell base station 20 becomes separate signals $d_1$, $d_2$ for each of the antennas 231 (#0, #1) in the radio communication section 230, and are transmitted as combined signals ($d_1+n_1$, $d_2+n_2$) by combining the signals $d_1$ and $d_2$ and the transmitter noises $n_1$ and $n_2$, via an amplifier. Each of these combined signals ($d_1+n_1$, $d_2+n_2$) passes through the transmission paths ($h_1$, $h_2$) different from each other, and is received by the antenna 251 of the downlink signal receiving section (listening apparatus) 250 as the wraparound signal 22. This received signal r of the wraparound signals ($d_1+n_1$, $d_2+n_2$) received by the antenna 251 is a combined signal as shown in the following expression (3), and is received by the downlink signal receiving section 250, and is inputted to the interference removing section 260.

[Expression 3]

$$r = h_1(d_1 + n_1) + h_2(d_2 + n_2) \quad (3)$$
$$= h_1 d_1 + h_2 d_2 + (h_1 n_1 + h_2 n_2)$$

The radio communication section 230 of the present configuration example reduces the wraparound interference of the downlink signal (data signal) $d_1$ and $d_2$, by controlling to stop the transmission of plural subframes of the small cell 20A at the timing when the synchronization signal 120 of the macro cell 10A is transmitting. Furthermore, the interference removing section 260 of the present configuration example detects the synchronization signal 120 of the macro cell 10A and performs a listening-synchronization, by removing the transmitter noises $n_1$ and $n_2$ of the radio communication section 230 remaining behind at the predetermined timing.

As shown in FIG. 26, in the small-cell base station 20 of the present configuration example, the interference removing section 260 provided in the preceding stage of the synchronization processing section 270 has a wraparound-interference canceller function of the residual transmitting signals $n_1$ and $n_2$ corresponding to the transmitter noise transmitted from the radio communication section 230 even when the downlink signal transmission is stopped. The interference removing section 260, in the only subframe in which the synchronization signal (PSS, SSS) of the macro cell 10A is interfered, among the subframes (#0 to #9) of the small cell 20A, directly receives the residual transmitting signal at the predetermined time from the radio communication section 230 by the receiving apparatus 280 using a wired communication link, acquires a complex baseband signal converted from the received residual transmitting signal, and performs a canceling process for removing the residual transmitting signals $n_1$ and $n_2$ of the acquired complex baseband signal from the received signal r, by the signal processing.

The synchronization processing section 270 of the present configuration example detects the timing of the synchronization signal 120 (PSS 121, SSS 122) of the macro-cell base station 10 based on the data signal and the received signal transmitted from the interference removing section 260 by removing the interference of the wraparound signal of the transmitter noise, and performs a time synchronization processing with the macro-cell base station 10.

According to the small-cell base station 20 of the present configuration example, it is capable of enhancing the accuracy of time synchronizing with the macro-cell base station 10, since the timing of the synchronization signal 120 of the macro-cell base station 10 can be accurately detected without being affected by the interference of the wraparound signal 22, by using the received signal of the downlink signal from which the interference of the wraparound signal 22 is removed. In particular, according to the small-cell base station 20 of the present configuration example, since the wraparound interference of the data signal can be reduced by stopping the transmission of data signal in the foregoing predetermined subframe and the wraparound interference of the transmitter noise can be reduced at the timing of the predetermined subframe, the accuracy of the wraparound interference canceller that removes and cancels the wraparound signal 22 is further improved, and it is capable of performing a listening-synchronization processing with more high accuracy.

As described above, according to the present embodiment, it is capable of performing the time synchronizing between the small-cell base station 20 and the macro-cell base station 10 by using the synchronization signal as a downlink signal of the macro cell 10A, even during operation of the small-cell base station 20.

Moreover, in the present embodiments, although it is described on the premise of application to the LTE/LTE-Advanced, if it is a system using a downlink radio communication with an OFDM (Orthogonal Frequency Division Multiplexing) system, a radio communication frame, an OFDM symbol, etc. similar to those in LTE/LTE-Advanced, the concept of the present invention can be applied to any system and furthermore is not limited to the configuration of the transmitter and receiver shown in the present embodiments.

The process steps and configuration elements in the mobile communication system, the macro-cell base station 10, the small-cell base station 20 and the user terminal apparatus (mobile station) 30, 31 described in the present specification can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, server, gateway, switching equipment, computer, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 macro-cell base station
10A macro cell
11, 12 downlink signal (macro cell signal)
20 small-cell base station
20A small cell
21 downlink signal (small cell signal)
22 wraparound signal
30, 31 user terminal apparatus (mobile apparatus, mobile station)
40 building
100 radio communication frame
110 subframe
110A control channel area
110B data channel area
120 synchronization signal
121 primary synchronization signal (PSS)
122 secondary synchronization signal (SSS)
140 broadcast signal (PBCH)
150 target subframe for interference cancellation
230 radio communication section (LTE transceiving apparatus)
231 antenna
231(#0) antenna #0
231(#1) antenna #1
240 transmission timing control section
250 downlink signal receiving section (listening apparatus)
251 antenna
255 downlink signal
260 interference removing section (wraparound canceller)
270 synchronization processing section (listening synchronization apparatus)
280 receiving apparatus

The invention claimed is:

1. A base station comprising:
a radio communication section capable of performing a downlink signal transmission of an OFDM (Orthogonal Frequency Division Multiplexing) system to a mobile station; and a transmission timing control section of controlling a transmission timing for the mobile station, and wherein an own cell is located in a cell of another base station capable of performing a downlink signal transmission of the OFDM system to a mobile station, and wherein the base station comprises:

a downlink signal receiving section of receiving a downlink signal that includes a downlink signal including a synchronizing signal transmitted from the other base station and a downlink wraparound signal transmitted from the own base station;

an interference removing section of removing an interference of the wraparound signal from a received signal of the downlink signal, with respect with a predetermined subframe in which the downlink wraparound signal from the own base station interferes with the synchronization signal of the other base station, among subframes of the downlink signal including the synchronization signal of the other base station; and a synchronization processing section of performing a time synchronization processing with the other base station by detecting a timing of the synchronization signal of the other base station based on a received signal of the downlink signal from which an interference of the wraparound signal is removed.

2. The base station according to claim 1, wherein the interference removing section:

removes a CP (cyclic prefix) from a received signal on a time axis of the downlink signal in accordance with a downlink signal transmission timing of the own base station;

transforms the received signal on the time axis, from which the CP is removed, to a received signal on a frequency axis by a Fourier transform;

performs a channel estimation for the wraparound signal based on the received signal on the frequency axis;

generates a replica on the frequency axis of the wraparound signal based on a result of the channel estimation and a known downlink signal transmitted from the own base station; and generates a received signal on the frequency axis, from which an interference of the wraparound signal is removed, by subtracting the replica on the frequency axis of the wraparound signal from the received signal on the frequency axis, and wherein the synchronization processing section:

obtains a frequency response by multiplying the received signal on the frequency axis, from which the interference of the wraparound signal is removed, by a complex conjugate of the synchronization signal of the other base station;

obtains an impulse response by transforming the frequency response by an inverse Fourier transform; and detects a synchronization signal timing of the other base station based on the impulse response.

3. The base station according to claim 2, wherein the radio communication section comprises one or plural antennas and is configured so as to transmit a downlink signal including a cell reference signal from each antenna, and wherein the interference removing section performs the channel estimation for each of the one or plural transmission paths of the downlink signal transmitted by each of the one or plural antennas, base on the cell reference signal included in each of one or plural downlink signals transmitted from each of the one or plural antennas.

4. The base station according to claim 3, wherein the interference removing section performs the channel estimation based on a cell reference signal or a synchronization signal including in a subframe that the other base station does not transmit, among subframes in each of the one or plural downlink signals transmitted by each of the one or plural antennas.

5. The base station according to claim 2, wherein the radio communication section comprises one or plural antennas and is configured so as to transmit a downlink signal including a synchronization signal from each antenna, and wherein the interference removing section performs the channel estimation for a downlink signal commonly transmitted to the one or plural antennas, base on the synchronization signal included in commonly in one or plural downlink signals transmitted from each of the one or plural antennas.

6. The base station according to claim 5, wherein the interference removing section performs the channel estimation based on a cell reference signal or a synchronization signal including in a subframe that the other base station does not transmit, among subframes in each of the one or plural downlink signals transmitted by each of the one or plural antennas.

7. The base station according to claim 2, wherein the interference removing section performs the Fourier transform with respect to the received signal of the downlink signal transmitted from the own base station, and wherein a head position of time window of the Fourier transform is set at a timing earlier than the downlink signal transmitting timing, and the head position of time window is located within the CP before an effective symbol in OFDM symbols of the downlink signal.

8. The base station according to claim 1, wherein the interference removing section:

removes a CP (cyclic prefix) from a received signal on a time axis of the downlink signal in accordance with a downlink signal transmission timing of the own base station;

transforms the received signal on the time axis, from which the CP is removed, to a received signal on a frequency axis by a Fourier transform;

performs a channel estimation for the wraparound signal based on the received signal on the frequency axis;

generates a replica on the frequency axis of the wraparound signal based on a result of the channel estimation and a known downlink signal transmitted from the own base station;

generates a received signal on the frequency axis, from which an interference of the wraparound signal is removed, by subtracting the replica on the frequency axis of the wraparound signal from the received signal on the frequency axis; and transforms the received signal on the frequency axis by an inverse Fourier transform; and generates a received signal on the time axis from which an interference of the wraparound signal is removed, and wherein the synchronization processing section:

obtain a cross correlation value by multiplying the received signal on the time axis, from which the interference of the wraparound signal is removed, by a complex conjugate of the synchronization signal of the other base station; and detects a synchronization signal timing of the other base station based on the cross correlation value.

9. The base station according to claim 8,
wherein the radio communication section comprises one or plural antennas and is configured so as to transmit a downlink signal including a cell reference signal from each antenna, and
wherein the interference removing section performs the channel estimation for each of the one or plural transmission paths of the downlink signal transmitted by each of the one or plural antennas, base on the cell reference signal included in each of one or plural downlink signals transmitted from each of the one or plural antennas.

10. The base station according to claim 8,
wherein the radio communication section comprises one or plural antennas and is configured so as to transmit a downlink signal including a synchronization signal from each antenna, and
wherein the interference removing section performs the channel estimation for a downlink signal commonly transmitted to the one or plural antennas, base on the synchronization signal included in commonly in one or plural downlink signals transmitted from each of the one or plural antennas.

11. The base station according to claim 8,
wherein the interference removing section performs the Fourier transform with respect to the received signal of the downlink signal transmitted from the own base station, and
wherein a head position of time window of the Fourier transform is set at a timing earlier than the downlink signal transmitting timing, and the head position of time window is located within the CP before an effective symbol in OFDM symbols of the downlink signal.

12. The base station according to claim 1,
wherein the interference removing section:
removes a CP (cyclic prefix) from a received signal on a time axis of the downlink signal in accordance with a downlink signal transmission timing of the own base station,
transforms the received signal on the time axis, from which the CP is removed, to a received signal on a frequency axis by a Fourier transform,
performs a channel estimation for the wraparound signal based on the received signal on the frequency axis,
generates a replica on the frequency axis of the wraparound signal based on a result of the channel estimation and a known downlink signal transmitted from the own base station,
generates a replica on the time axis of the wraparound signal by transforming the replica on the frequency axis of the wraparound signal by an inverse Fourier transform;
adds the CP to the replica of the wraparound signal on the time axis; and
generates a received signal on the time axis from which an interference of the wraparound signal is removed, by subtracting the replica on the time axis of the wraparound signal, to which the CP is added, from the received signal on the time axis, and wherein the synchronization processing section:
obtains a cross correlation value by multiplying the received signal on the time axis, from which an interference of the wraparound signal is removed, by a complex conjugate of the synchronization signal of the other base station; and
detects a synchronization signal timing of the other base station based on the cross correlation value.

13. The base station according to claim 12,
wherein the radio communication section comprises one or plural antennas and is configured so as to transmit a downlink signal including a cell reference signal from each antenna, and
wherein the interference removing section performs the channel estimation for each of the one or plural transmission paths of the downlink signal transmitted by each of the one or plural antennas, base on the cell reference signal included in each of one or plural downlink signals transmitted from each of the one or plural antennas.

14. The base station according to claim 12,
wherein the radio communication section comprises one or plural antennas and is configured so as to transmit a downlink signal including a synchronization signal from each antenna, and
wherein the interference removing section performs the channel estimation for a downlink signal commonly transmitted to the one or plural antennas, base on the synchronization signal included in commonly in one or plural downlink signals transmitted from each of the one or plural antennas.

15. The base station according to claim 12,
wherein the interference removing section performs the Fourier transform with respect to the received signal of the downlink signal transmitted from the own base station, and
wherein a head position of time window of the Fourier transform is set at a timing earlier than the downlink signal transmitting timing, and the head position of time window is located within the CP before an effective symbol in OFDM symbols of the downlink signal.

16. The base station according to claim 1,
wherein the interference removing section:
obtain an impulse response by calculating a cross correlation function between the received signal on the time axis of the downlink signal and the downlink signal transmitted from the own base station;
generates a replica on the time axis of the wraparound signal based on the impulse response and a known downlink transmitting signal transmitting from the own base station; and
generates a received signal on the time axis from which an interference of the wraparound signal is removed, by subtracting the replica on the time axis of the wraparound signal from the received signal on the time axis, and wherein the synchronization processing section:
obtains a cross correlation value by multiplying the received signal on the time axis generated in the interference removing section by a complex conjugate of the synchronization signal of the other base station; and
detects a synchronization signal timing of the other base station based on the cross correlation value.

17. A base station comprising:
a radio communication section capable of performing a downlink signal transmission of an OFDM (Orthogonal Frequency Division Multiplexing) system to a mobile station; and
a transmission timing control section of controlling a transmission timing for the mobile station, and
wherein an own cell is located in a cell of another base station capable of performing a downlink signal transmission of the OFDM system to a mobile station, and
wherein the transmission timing control section controls so as to stop a downlink signal transmission with respect to a predetermined subframe in which a downlink wraparound signal from the own base station interferes with a synchronization signal of the other base station, among subframes of the downlink signal including the synchronization signal of the other base station, and
wherein the base station comprises:
a downlink signal receiving section of receiving a downlink signal including a synchronization signal transmitted from the other base station;
an interference removing section of directly receiving a residual transmitting signal corresponding to a transmitter noise transmitted from the radio communication section by a wired communication link even in a timing of stopping the downlink signal transmission of the own base station, acquiring a complex baseband signal by converting from the received residual transmitting signal, generating a replica signal of the residual transmitting signal with respect to the predetermined subframe based on the acquired complex baseband signal, and removing an interference of the residual transmitting signal from the received signal of the downlink signal; and
a synchronization processing section of performing a time synchronization processing with the other base station by detecting a synchronization signal timing of the other base station based on the received signal of the downlink signal from which the interference of the residual transmitting signal is removed.

18. A communication system comprises:
a base station according to claim 1; and
another base station corresponding to a cell in which a cell of the base station according to claim 1 is located.

19. A time synchronization method between base stations, the time synchronization method synchronizing between a first base station capable of performing a downlink signal transmission of an OFDM (Orthogonal Frequency Division Multiplexing) system to a mobile station and a second base station capable of performing a downlink signal transmission the OFDM system to a mobile station, an own cell of the second base station being located in a cell of the first base station,
wherein the second base station:
receives a downlink signal including a downlink signal including a synchronization signal transmitted from the first base station and a downlink wraparound signal transmitted from the own base station;
removes an interference of the wraparound signal from a received signal of the downlink signal with respect to a predetermined subframe in which the downlink wraparound signal from the own base station interferes with the synchronization signal of the first base station, among subframes of the downlink signal including the synchronization signal of the first base station; and
performs a time synchronization processing with the first base station by detecting a synchronization signal timing of the first base station based on a received signal of the downlink signal from which the interference of the wraparound signal is removed.

20. A time synchronization method between base stations, the time synchronization method synchronizing between a first base station capable of performing a downlink signal transmission of an OFDM (Orthogonal Frequency Division Multiplexing) system to a mobile station and a second base station capable of performing a downlink signal transmission of the OFDM system to a mobile station, an own cell of the second base station being located in a cell of the first base station,
wherein the second base station:
controls to stop a downlink signal transmission with respect to a predetermined subframe in which a downlink wraparound signal from an own base station interferes with a synchronization signal of the first base station, among subframes of the downlink signal including the synchronization signal of the first base station;
directly receives a residual transmitting signal corresponding to a transmitter noise transmitted from a radio communication section of the own base station by a wired communication link even in a timing of stopping the downlink signal transmission of the own base station;
acquires a complex baseband signal by converting from the received residual transmitting signal;
receives a downlink signal including a synchronization signal transmitted from the first base station;
generates a replica signal of the residual transmitting signal with respect to the predetermined subframe based on the acquired complex baseband signal;
removes an interference of the residual transmitting signal from a received signal of the downlink signal; and
performs a time synchronization processing with the first base station by detecting a synchronization signal timing of the first base station based on a received downlink signal from which the interference of the transmitter noise is removed.

21. A communication system comprises:
a base station according to claim 17; and
another base station corresponding to a cell in which a cell of the base station according to claim 17 is located.

* * * * *